(12) United States Patent
Tsutsumi et al.

(10) Patent No.: US 7,017,167 B2
(45) Date of Patent: Mar. 21, 2006

(54) DISC RECORDING AND/OR REPRODUCTION APPARATUS

(75) Inventors: Hideaki Tsutsumi, Tokyo (JP); Yoichiro Mitsumoto, Tokyo (JP); Hisashi Negoro, Chiba (JP)

(73) Assignee: Sony Corporation, (JP)

( * ) Notice: Subject to any disclaimer, the term of this patent is extended or adjusted under 35 U.S.C. 154(b) by 150 days.

(21) Appl. No.: 10/416,899

(22) PCT Filed: Sep. 25, 2002

(86) PCT No.: PCT/JP02/09899

§ 371 (c)(1),
(2), (4) Date: Sep. 17, 2003

(87) PCT Pub. No.: WO03/030164

PCT Pub. Date: Apr. 10, 2003

(65) Prior Publication Data

US 2004/0052167 A1    Mar. 18, 2004

(30) Foreign Application Priority Data

Sep. 27, 2001    (JP) ............................. 2001-298222

(51) Int. Cl.
*G11B 17/03*    (2006.01)

(52) U.S. Cl. .................................................... 720/610

(58) Field of Classification Search ............... 360/77.2, 360/99.06, 96.5, 133; 720/610
See application file for complete search history.

(56) References Cited

U.S. PATENT DOCUMENTS

| | | | | | |
|---|---|---|---|---|---|
| 4,471,397 | A | * | 9/1984 | Cloutier | 360/133 |
| 4,652,961 | A | * | 3/1987 | Dieffenbach | 360/133 |
| 4,792,872 | A | * | 12/1988 | Nakanishi et al. | 360/96.5 |
| 5,216,558 | A | * | 6/1993 | Griffith et al. | 360/99.06 |

FOREIGN PATENT DOCUMENTS

| | | | |
|---|---|---|---|
| EP | 1 003 171 A1 | | 5/2000 |
| JP | 58-111148 A1 | | 7/1983 |
| JP | 05303816 A | * | 11/1993 |
| JP | 10-228702 | | 8/1998 |
| JP | 2000-348416 A1 | | 12/2000 |

OTHER PUBLICATIONS

Supplemental EPO Search Report dated Mar. 24, 2005.
International Search Report and Examination Report Jan. 28, 2003.

* cited by examiner

*Primary Examiner*—Tianjie Chen
(74) *Attorney, Agent, or Firm*—Rader, Fishman & Grauer PLLC; Ronald P. Kananen

(57) ABSTRACT

A disc type recording and/or reproducing apparatus automatically performs the opening and closing of a shutter provided on a cartridge housing an optical disc in its case, and prevents the above-mentioned opening and closing mechanism from affecting the cartridge after an end of loading. When a DVR cartridge (51) is drawn into a recording and reproducing position by means of a tray (13), a shutter opening and closing mechanism (65) arranged on the side of the apparatus is relatively moved with regard to the cartridge (51). Thereby, shutter plates (100) of the cartridge (51) are opened or closed. Then, after the shutter plates (100) are completely released, the shutter opening and closing mechanism (65) is retracted by means of a cam (85) to be away from the cartridge (51).

5 Claims, 38 Drawing Sheets

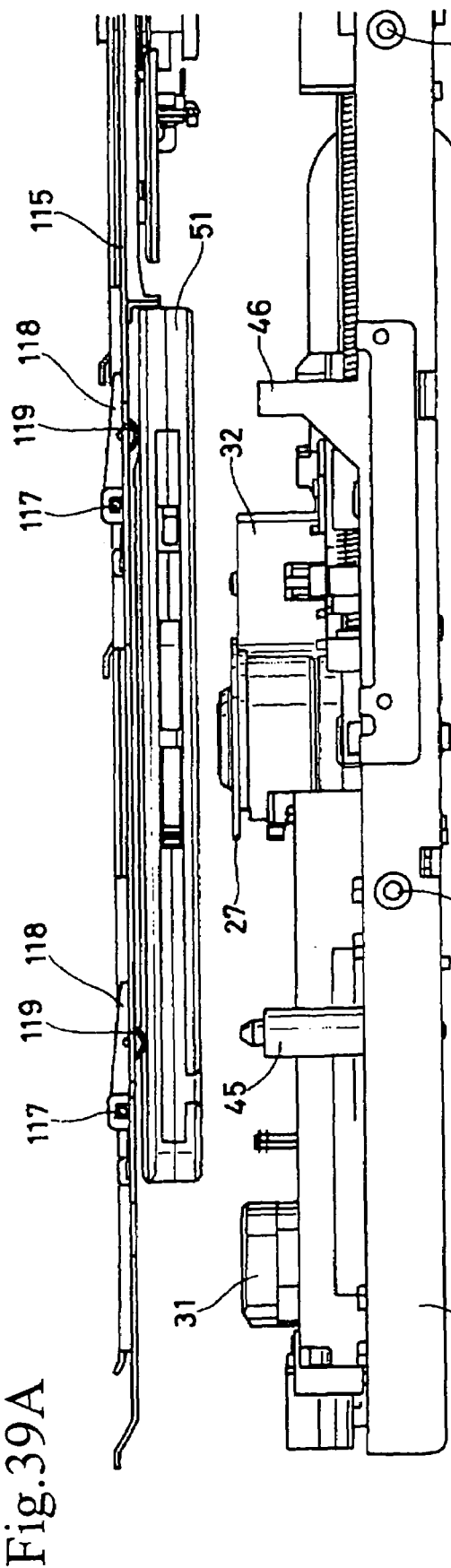
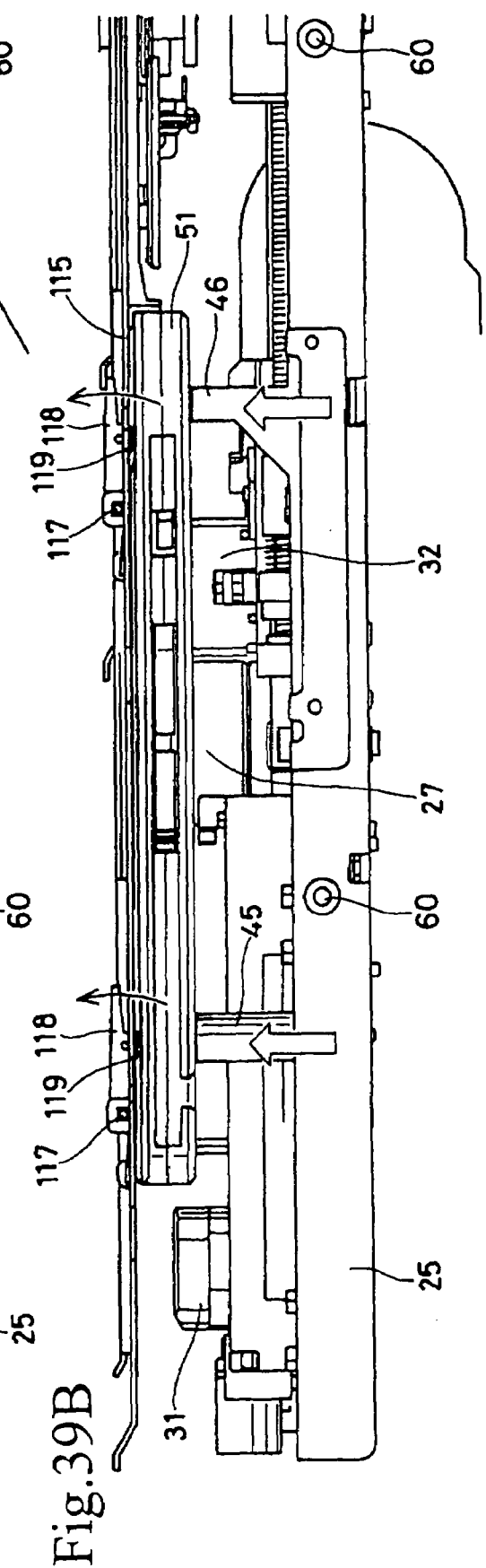
Fig.39A
Fig.39B

DISC RECORDING AND/OR REPRODUCTION APPARATUS

TECHNICAL FIELD

The present invention relates to a disc type recording and/or reproducing apparatus, and more particularly to a disc type recording and/or reproducing apparatus which makes a cartridge having a disc-like recording medium housed in its case move to a recording and reproducing position by means of a tray to perform recording and/or reproducing by means of a head.

BACKGROUND ART

A disc type recording and/or reproducing apparatus for performing recording and/or reproducing by means of a disc-like recording medium composed of an optical disc such as a CD (compact disc) and a DVD is widely used for recording and reproducing of music and images. Moreover, this kind of the disc-like recording medium is used as a storage device of information processing equipment such as a computer.

In this case, the above-mentioned disc-like recording medium is placed on a tray, and then the tray is drawn into a recording and reproducing position from a pulled-out position. Then, in this state, a turntable constituting a rotary drive section rises from a lower position so as to float up the disc-like recording medium from the tray. Then, the turntable drives the disc-like recording medium to rotate. In the state like this, the disc type recording and/or reproducing apparatus performs recording or reproducing while moving an optical pickup in a radial direction with regard to the disc-like recording medium.

In the disc type recording and/or reproducing apparatus including such an optical disc, in particular, in a DVR performing a high density recording, a cartridge having an optical disc housed in its case is used for preventing the optical disc from being tainted owing to dust and the like. Commonly, the case of the cartridge is provided with an opening. The opening is closed with a shutter at the time it is not used, and the shutter is opened when the cartridge is mounted at the recording and reproducing position. Thereby, an optical head is allowed to access the optical disc.

Consequently, it is preferable for the disc type recording and/or reproducing apparatus using the cartridge to make the shutter be completely opened in synchronization with the loading of the cartridge into the recording and reproducing position. Hereupon, even if the closing state of the shutter is incomplete, the shutter must completely be opened without fail. Moreover, when the cartridge is taken out after completion of recording and reproducing, it is necessary to close the opening of the case surely with the shutter.

Furthermore, in a disc type recording and/or reproducing apparatus of a cartridge type, when the cartridge is loaded at the recording and reproducing position, it is necessary to position the case of the cartridge in that state correctly not only in its surface direction but also in its height direction in order to rotate the optical disc smoothly in the state of floating up therein.

The present invention was made in view of such problems, and aims to provide a disc type recording and/or reproducing apparatus in which, when a cartridge is mounted at a recording and reproducing position, an opening of its case is completely opened; when the cartridge is taken out from the recording and reproducing position, the opening of the case is completely closed with a shutter; and further, the position of the cartridge is correctly held during operations of recording and reproducing.

DISCLOSURE OF THE INVENTION

The present invention is related to a disc type recording and/or reproducing apparatus which moves a cartridge having a disc-like recording medium housed in a case thereof to a recording and reproducing position by means of a tray to perform recording and/or reproducing by means of a head, the apparatus characterized by including:

a shutter for opening and closing an opening formed in the case of the cartridge for allowing the head to access to the disc-like recording medium; and a shutter opening and closing mechanism provided on a side of the apparatus in order to open and close the shutter, and characterized in that:

the shutter is opened by a relative motion of the shutter opening and closing mechanism with regard to the cartridge when the cartridge is moved to the recording and reproducing position by means of the tray, and the shutter is closed by a relative motion of the shutter opening and closing mechanism with regard to the cartridge when the cartridge is moved to a pulled-out position by means of the tray.

Hereupon, it may be adopted that the tray is provided with a stopper for pressing the shutter opening and closing mechanism to a portion to be operated of the cartridge in order that the shutter opening and closing mechanism may relatively slide on the stopper when the shutter is being opened or the shutter is being closed. Moreover, it may be adopted that the tray includes a cam for separating the shutter opening and closing mechanism from the portion to be operated of the cartridge in order that the shutter opening and closing mechanism may release a pressing force applied to the cartridge by the mechanism when a release of the shutter or a close of the shutter is completed.

Moreover, it may be adopted that the shutter opening and closing mechanism is provided with a phase shift rectifying member for a release operation, and that a limiter function is given to the phase shift rectifying member by a compression coil spring to make the shutter be in a fully opened state by engaging with a releasing recess on a side of the cartridge even if the cartridge including the shutter whose opening is unsettled is mounted. Moreover, it may be adopted that the shutter opening and closing mechanism is provided with a phase shift rectifying member for a close operation, and that a limiter function is given to the phase shift rectifying member by a compression coil spring to make the shutter be in a fully closed state by engaging with a closing recess on a side of the cartridge even if the cartridge including the shutter whose opening is unsettled is ejected.

Moreover, the present invention is related to a disc type recording and/or reproducing apparatus which moves a cartridge having a disc-like recording medium housed in a case thereof from a first position at which the cartridge is mounted or demounted to a second position at which recording and/or reproducing is performed by means of a head, the apparatus characterized by including:

a shutter for opening and closing an opening of the case of the cartridge for allowing the head to access to the disc-like recording medium in the case; and a shutter opening and closing mechanism provided on a side of the apparatus in order to open and close the shutter, and characterized in that:

the shutter is released by a relative motion of the shutter opening and closing mechanism with regard to the cartridge when the cartridge is moved from the first position to the second position, and the shutter opening and closing mechanism releases a pressing force which the shutter opening and closing mechanism applies to the cartridge when a release of the shutter is completed.

Furthermore, the present invention is related to a disc type recording and/or reproducing apparatus which moves a cartridge having a disc-like recording medium housed in a case thereof to a recording and reproducing position by means of a tray to perform recording and/or reproducing by means of a head, the apparatus characterized by including:

a rotary drive section for driving the disc-like recording medium;

a base unit including the head accessing the disc-like recording medium to perform the recording and/or reproducing;

supporting means for supporting the cartridge in a state of floating up from the tray in accordance with a rising operation of the base unit, the supporting means is provided on the base unit; and a holder plate provided with pressing means for pressing a plurality of portions of a top surface of the cartridge elastically, the holder plate arranged above the tray drawn-into the recording and reproducing position.

Hereupon, it is preferable that the holder plate is provided with a pressing roller energized by a spring, and the top surface of the cartridge is pressed by the pressing roller, which rotates in a moving direction when the cartridge is moved by means of the tray.

A preferable aspect of the present invention is a disc type recording and/or reproducing apparatus, in which, in a case where a cartridge housing a rotary disc type recording medium is mounted, a mechanism related to opening and closing of a shutter closing an opening of a case of the cartridge for the purpose of preventing dust performs the mounting and the ejecting of the cartridge by means of a tray; fixedly arranges a shutter opening and closing mechanism on a side of the apparatus; and consequently performs opening and closing of the shutter of the cartridge by means of a loading operation and an unloading operation of the tray having the cartridge mounted thereon.

In particular, a stopper is provided at a relatively sliding position of the shutter opening and closing mechanism on a side of a back face of the tray, and the stopper slides on a back face of the shutter opening and closing mechanism, and thereby a segment gear and an engagement groove for phase shift rectification on a side of the cartridge are surely caught to perform opening and closing operations of the shutter of the cartridge surely. Moreover immediately before a disc in the case of the cartridge is chucked in the process of the loading of the cartridge, the shutter opening and closing mechanism is retracted by means of a cam provided on the back face of the tray, and consequently a load imposed on the cartridge by the shutter opening and closing mechanism for regulating backlashes of the cartridge is released. Moreover, immediately after a release of the chucking of the disc in the case of the cartridge in the process of the unloading of the cartridge, the shutter opening and closing mechanism is slid to approach the cartridge by means of a compression coil spring located at the lower part of a shutter opening and closing drive base, and the load is imposed on the cartridge for regulating the backlashes of the cartridge.

Moreover, a phase shift rectifying member on one side, which is provided on the shutter opening and closing mechanism, is given a limiter function by a compression coil spring to engage with only a corresponding position of the cartridge. Then, even if a cartridge the opening of the shutter of which is unsettled to be half opened or the like is inserted, a shutter release state can be realized at a predetermined position without damaging the cartridge and the shutter opening and closing mechanism on the side of the apparatus. Moreover, another phase shift rectifying member on the other side is given a limiter function by means of a compression coil spring to engage with only another corresponding position of the cartridge. Thereby, even if the opening of the shutter of the cartridge is unsettled to be half opened or the like, the cartridge is ejected after the shutter is fully closed without damaging the cartridge and the shutter opening and closing mechanism on the side of the apparatus. Hereupon, the elastic restoring force of the compressed coil spring for sliding the shutter opening and closing mechanism to approach the cartridge is set to be a value larger than that of the elastic restoring force of the compressed coil spring giving the limiter function to the pair of phase shift rectifying members.

According to the shutter opening and closing mechanism of the disc type recording and/or reproducing apparatus like this, in a mechanism for moving a cartridge to a recording and reproducing position by means of a tray to mount the cartridge at the position, it is possible to make a cartridge whose opening of a shutter is unsettled be in a fully opened state or in a fully closed state. Moreover, the whole of the mechanism can be housed in a small space. Moreover, by means of a pair of phase shift rectifying members, it becomes possible to prevent any phase shift of the shutter during its opening and closing operations surely independently of the outside dimension of the cartridge and the dimension of the tray. Moreover, in the disc chucking after the shutter is fully opened, the shutter opening and closing mechanism is separated from a side face of the cartridge by means of a cam, and consequently it is prevented to hinder the positioning of the cartridge in the apparatus.

Moreover, a preferable aspect of the present invention is a disc type recording and/or reproducing apparatus moving a cartridge housing a disc-like recording medium therein to a recording and reproducing position to perform recording and reproducing, wherein a case of the cartridge housing the disc-like recording medium therein is pressed down with a slight pressure divided at a plurality of points lest a chassis of a base unit provided with an optical head and a rotary drive section of a disc should be bent because recording or reproducing is performed in the state in which a lens of an optical head and a surface of the disc approach each other very closely. Thereby, the cartridge loaded at the recording and reproducing position can correctly be positioned.

BRIEF DESCRIPTION OF DRAWINGS

FIG. 39A to FIG. 39B are side views of a main portion showing a relationship between a rising operation of the base unit and the pressing mechanism.

BEST MODE FOR CARRYING OUT THE INVENTION (1) Descriptions of Configuration

Figure 1:
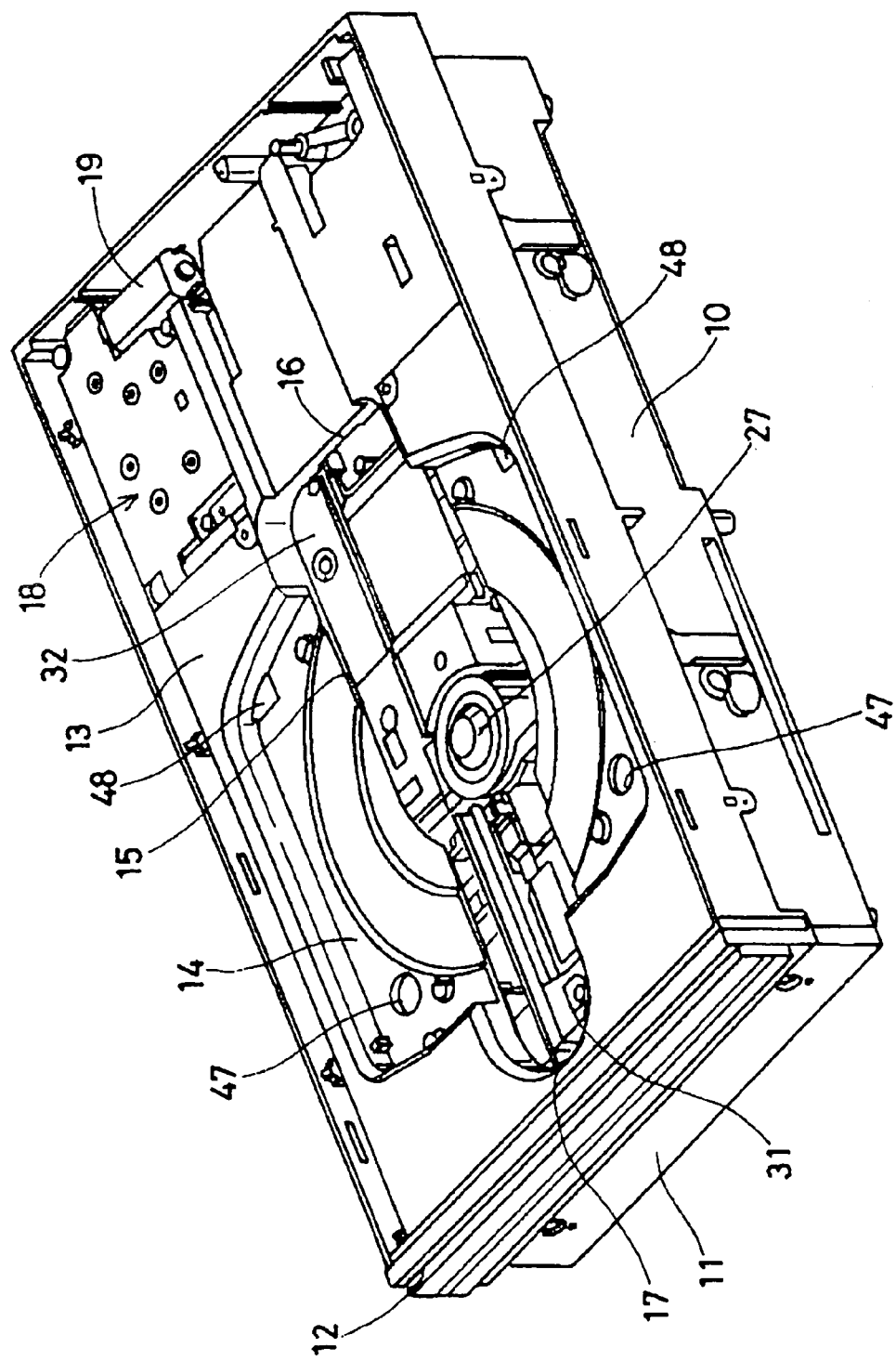
FIG. 1 is a perspective view of substantial parts of a disc type recording and reproducing apparatus.
Figure 2:
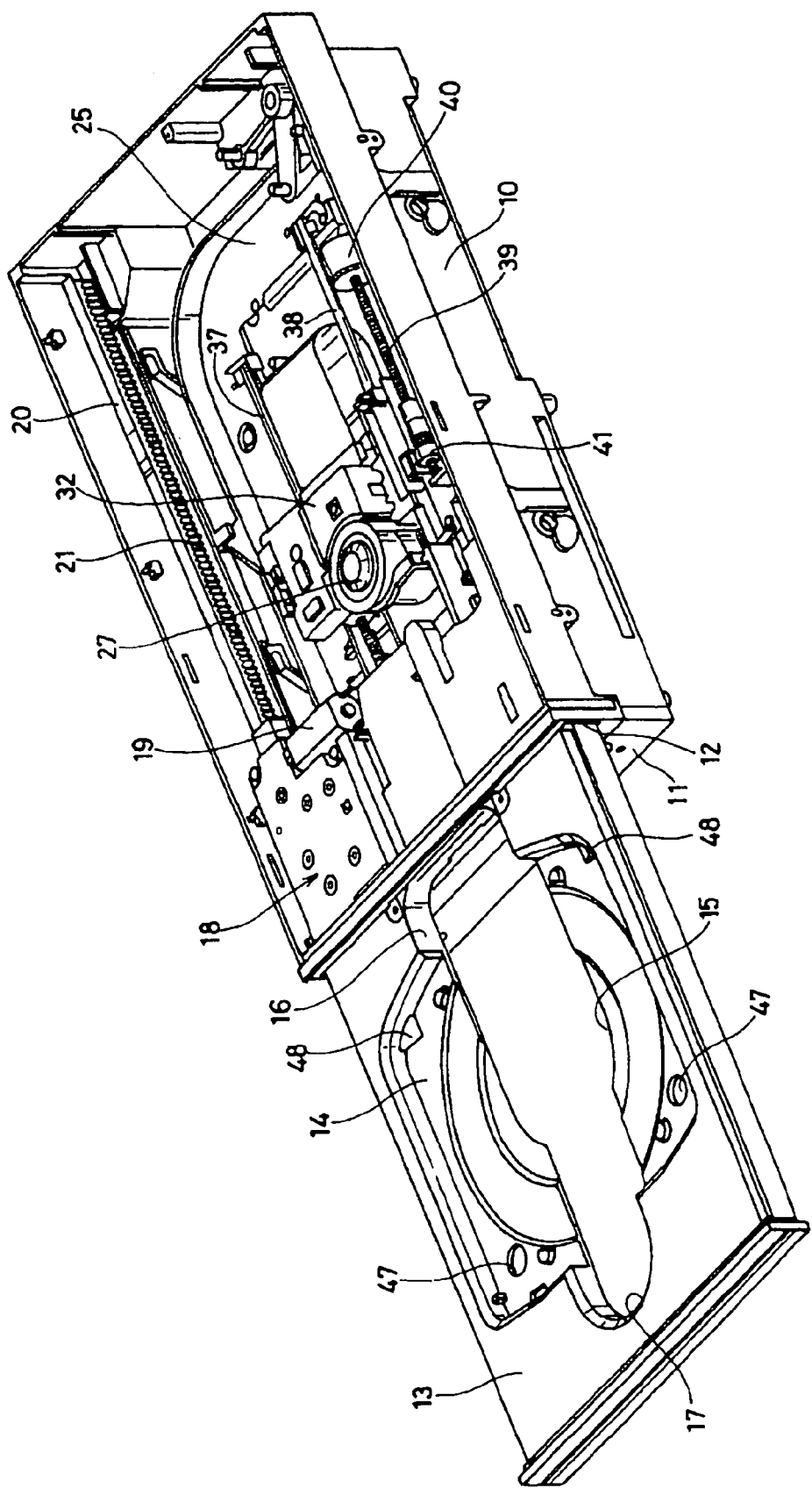
FIG. 2 is a perspective view of a state of pulling out a tray of the apparatus.
Figure 3:
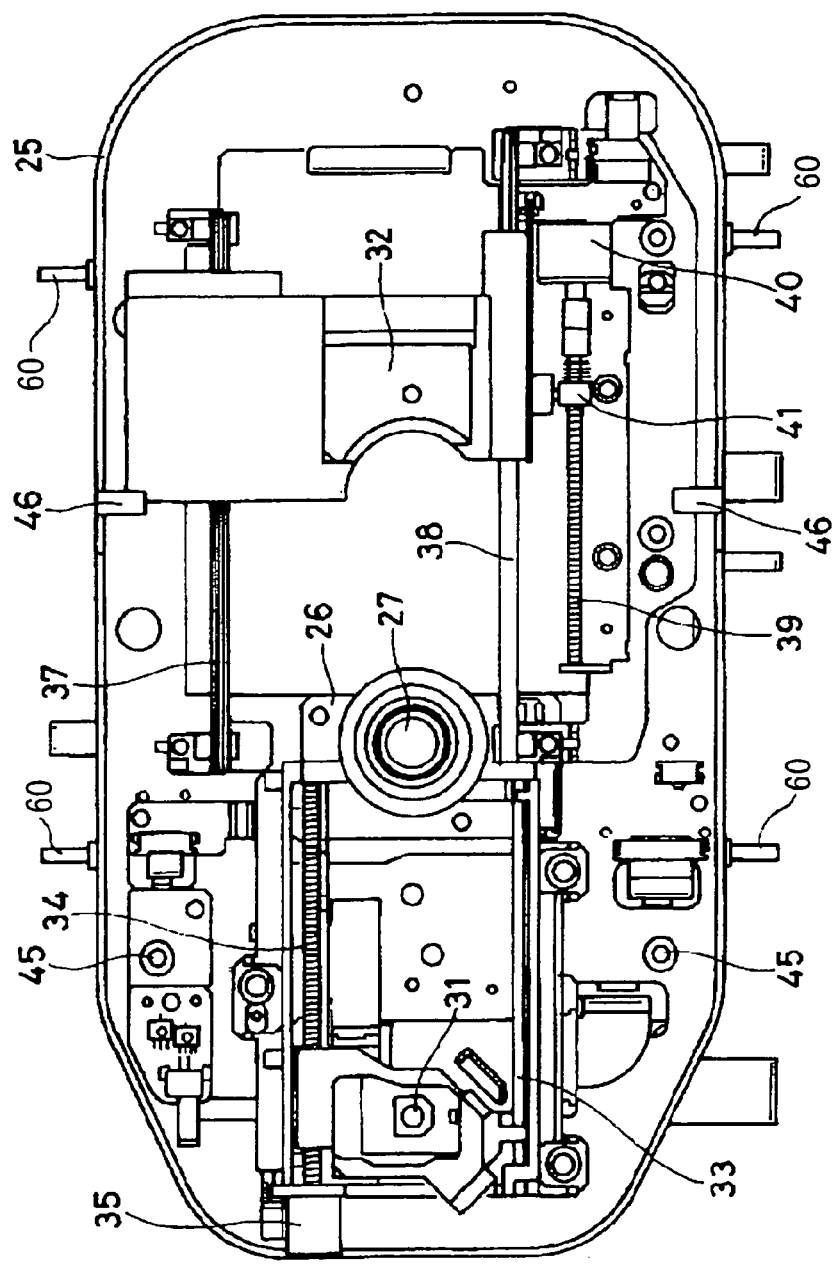
FIG. 3 is a plan view of a base unit.
Figure 4:
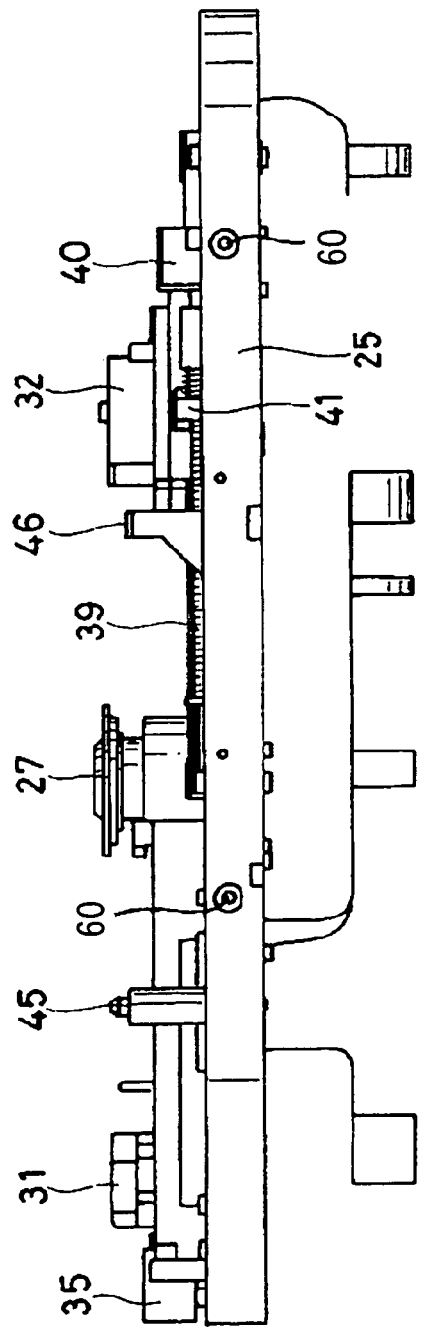
FIG. 4 is a side view of the base unit.
Figure 5:
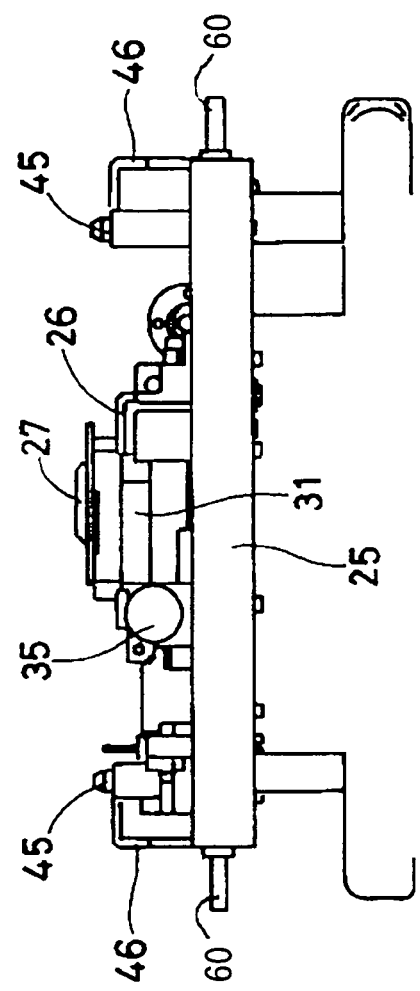
FIG. 5 is a front view of the base unit.
Figure 6:
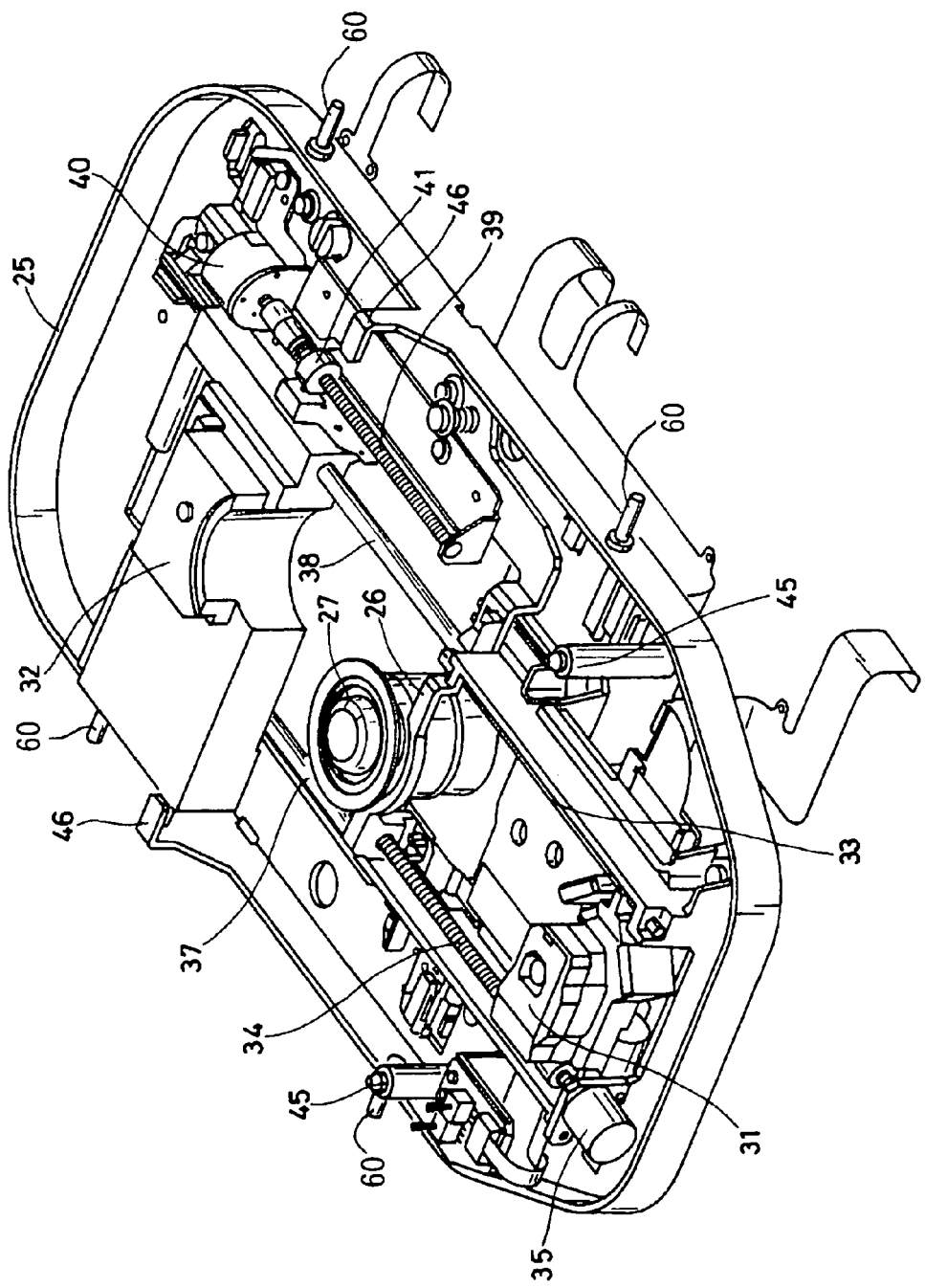
FIG. 6 is a perspective view of the base unit.

FIG. 1 and FIG. 2 show a whole configuration of a disc type recording and reproducing apparatus according to an embodiment of the present invention. The apparatus is equipped with an external housing 10 shaped in a flat rectangular parallelepiped. Incidentally, as shown in FIG. 1 and FIG. 2, an upper part thereof is opened up hereupon. Then, an oblong opening 12 is formed in a front panel 11 for blocking up an opening on a front side of the external housing 10. A tray 13 is built in the external housing 10 in a state capable of being pulled out through the oblong opening 12.

The tray 13 has a recess 14 at a substantially central position thereof for receiving a cartridge or a bare disc, and an opening 15 extending in a longitudinal direction in a state of crossing the recess 14 is formed. A U-shaped cut 16 is provided in a connected arrangement on the rear side of the opening 15, and a semicircular cut 17 is formed on the front side.

Moreover, a drive unit 18 is formed in a side part on a deeper part of the tray 13. Furthermore, a motor 19 for driving the drive unit 18 is fitted thereto. The tray 13 is supported to be slidable by step portions 20 on both sides and inside of the external housing 10. Pinions constituting the end of the drive unit 18 engage with racks 21 on the lower side of the step portions 20. Thereby, the tray 13 is configured to be self-propelled in a state capable of being pulled out and being housed through the oblong opening 12 as shown in FIG. 1 and FIG. 2.

A base unit 25 as shown in FIG. 3 to FIG. 6 is provided above a base plate of the external housing 10. The base unit is composed of a chassis made of a sheet metal. A turntable 27 constituting a rotary drive section is provided at the substantially central portion of the base unit 25 via a bracket 26. It is so configured that the turntable 27 is directly driven by a motor below the turntable 27.

Moreover, on the base unit 25, a DVD pickup 31 is arranged on a front side with regard to the turntable 27, and a DVR pickup 32 is arranged on a rear side with regard to the turntable 27. Hereupon, the DVD pickup 31 is supported by a guide rod 33 and a feed screw 34 at both sides thereof. The feed screw 34 is driven to rotate by a stepping motor 35. Thereby, the DVD pickup 31 is moved in a radial direction of an optical disc.

On the other hand, the DVR pickup 32 on the rear side is guided by a pair of guide rods 37, 38 on both sides. Moreover, a feed screw 39 for moving the DVR pickup 32 in the radial direction with regard to the optical disc is provided. The feed screw 39 is driven by a stepping motor 40. Moreover, the feed screw 39 screws together with a nut 41 of the pickup 32.

Moreover, a pair of support rods 45 is arranged in a standing condition on both sides at the front on the base unit 25, and support arms 46 are continuously provided at the rear on the base unit 25 to be integrated. When the base unit 25 rises in accordance with the movement of an elevation mechanism, these support rods 45 and support arms 46 project from openings 47, 48 of the tray 13. Thereby, the support rods 45 and the support arms 46 support the under surface of a DVR cartridge 51 to be placed on the tray 13 at its four corner parts.

Figure 13:
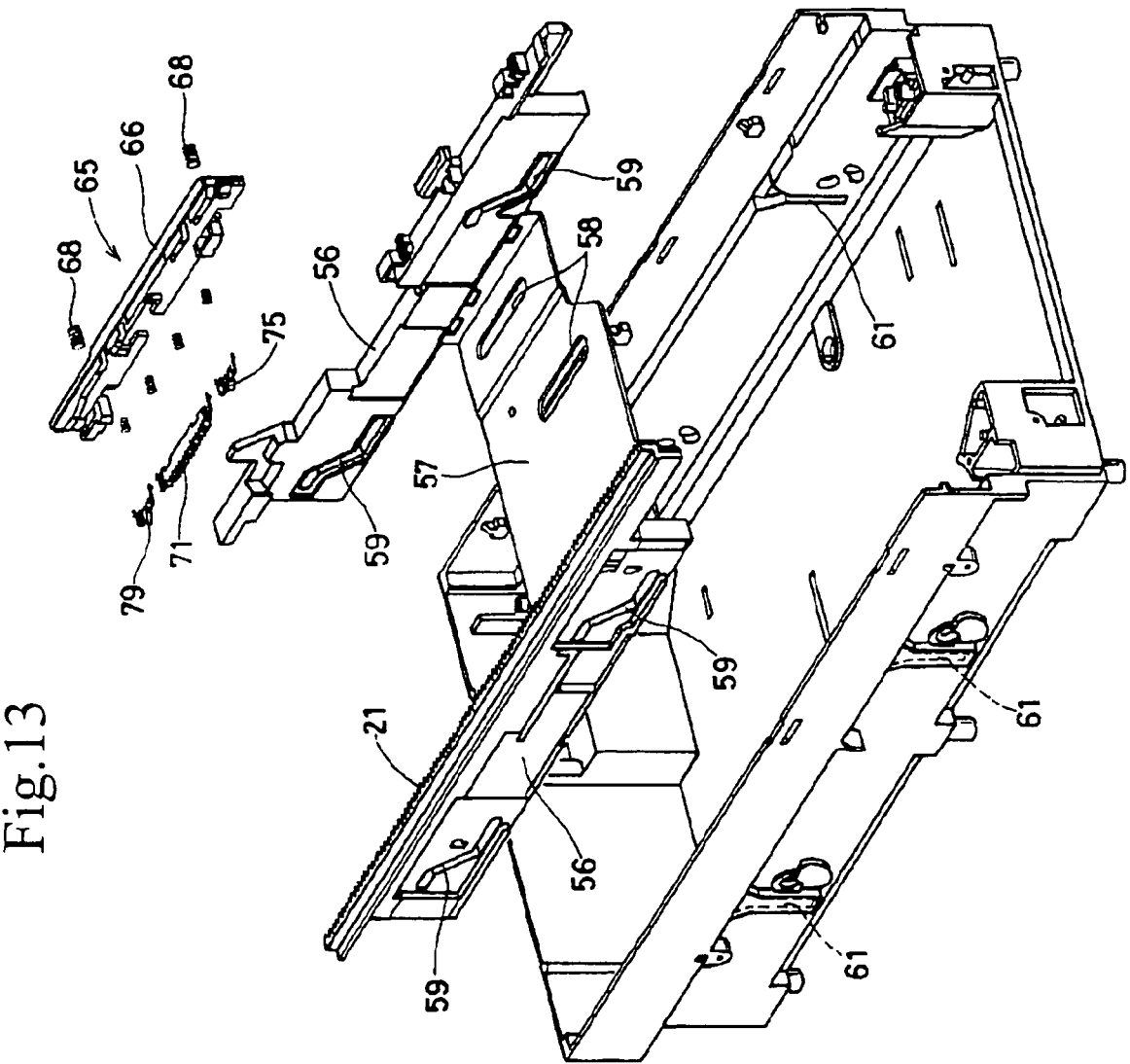
FIG. 13 is an exploded perspective view showing the fitting of a chucking slider.

Next, a description will be given to a mechanism for opening and closing a shutter provided to the DVR cartridge 51 being a cartridge type disc-like recording medium. As shown in FIG. 13, the recording and reproducing apparatus is provided with chucking sliders 56 on the base plate of the external housing 10. The chucking sliders 56 are located inside of both the side plates of the external housing 10. The sliders 56 on both sides are linked with each other with a linking plate 57. Then, elongated holes 58 are formed in the linking plate 57. The elongated holes 58 receive screws screwed in the base plate of the external housing 10. Thereby, the chucking sliders 56 are adapted to perform sliding operations. A pair of cam grooves 59 are severally formed on the chucking sliders 56 on both sides.

The cam grooves 59 are adapted to receive pins 60 implanted on both sides of the base unit 25. Moreover, the tip portions of the pins 60 are engaged with vertical grooves 61 formed on an inner surface of the external housing 10. Thereby, when the chucking sliders 56 move forward and backward, the base unit 25 is adapted to perform ascending and descending operations. Moreover, the rack 21 is formed on an inner surface of the chucking slider 56 on one side. The rack 21 is adapted to engage with the pinions constituting an output end of the drive unit 18. Thereby, the tray 13 moves between a recording and reproducing position and a pulled-out position while being self-propelled in accordance with an output of the motor 19.

Figure 14:
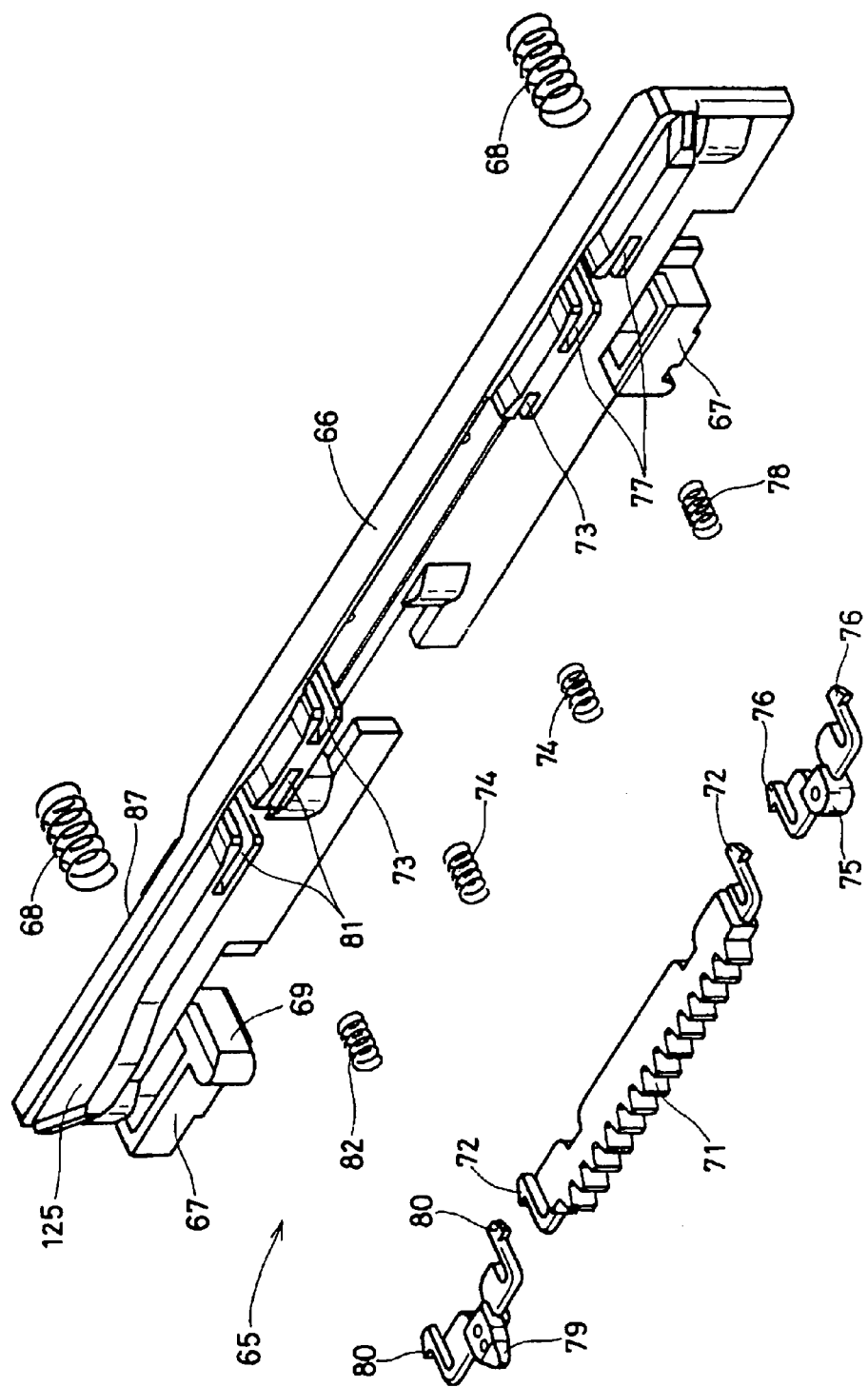
FIG. 14 is an exploded perspective view of a shutter opening and closing mechanism.
Figure 15:
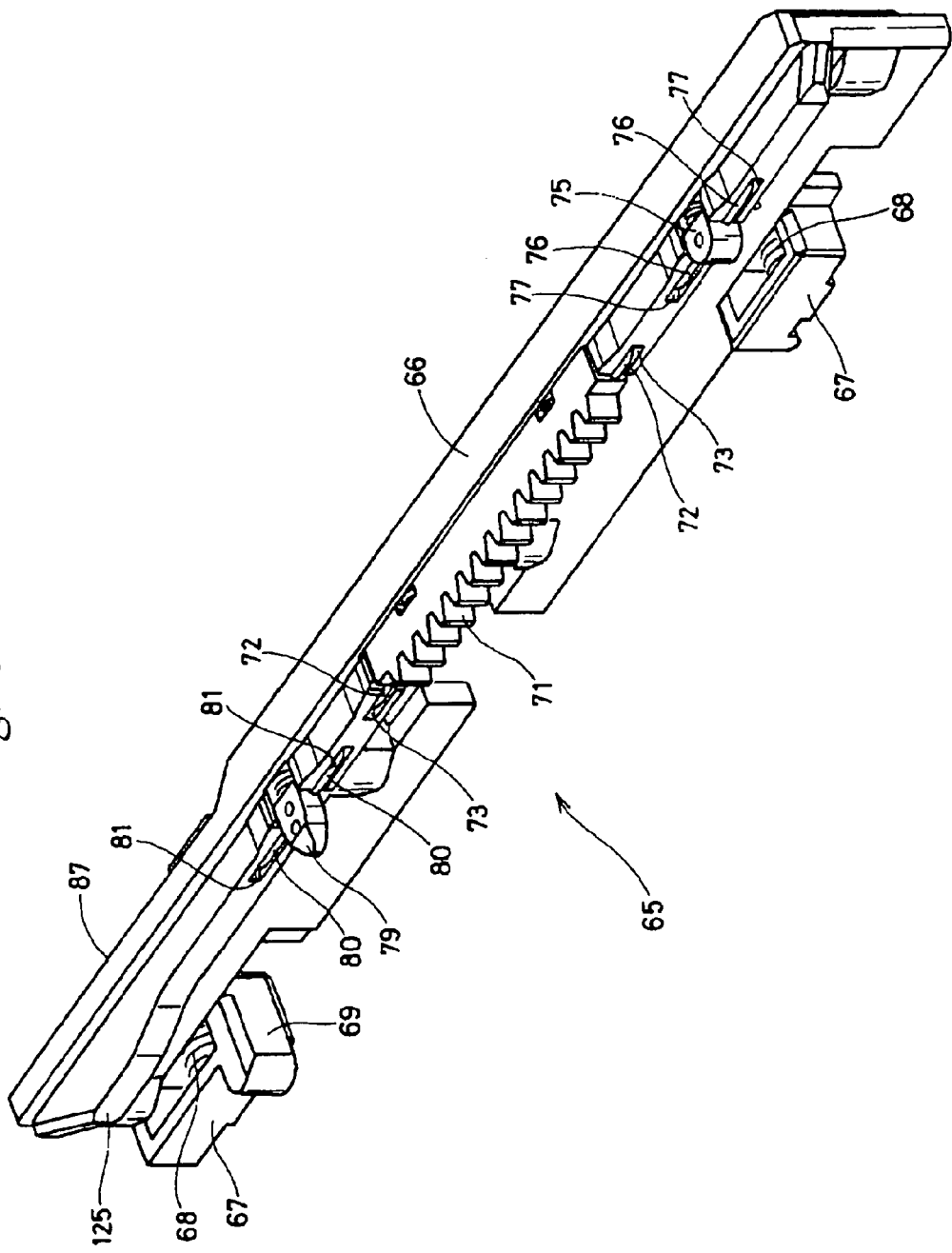
FIG. 15 is an external perspective view of the shutter opening and closing mechanism.

A shutter opening and closing mechanism 65 as shown in FIG. 14 and FIG. 15 is fitted on the upper part of a slider 56 on one side of the pair of chucking sliders 56 on the right and the left sides. The shutter opening and closing mechanism 65 is provided with an opening and closing base 66 and is also provided with retainer portions 67 on both ends thereof in a lengthwise direction as shown in FIG. 14 and FIG. 15. The retainer portions 67 are configured to receive springs 68. The springs 68 energizes the base 66 so as to separate from the chucking slider 56. Moreover, the opening and closing base 66 is provided with a projection 69 on one end thereof.

A rack 71 is fitted at an intermediate position of the opening and closing base 66 in the lengthwise direction thereof. The rack 71 is provided with an engaging claw 72 on both the ends in the lengthwise direction thereof severally. These engaging claws 72 are adapted to engage with engagement openings 73 of the opening and closing base 66. Moreover, the rack 71 is energized to protrude from the surface of the base 66 by springs 74.

Furthermore, the opening and closing base 66 is provided with a phase shift rectifying member 75 at a part on a front end side at one end of the opening and closing base 66 in the lengthwise direction thereof. The rectifying member 75 is provided with a pair of engaging claws 76. These engaging claws 76 are engaged with engagement openings 77, and are energized by a spring 78 into a direction in which the engaging claws 76 project. Moreover, another phase shift rectifying member 79 is fitted on a rear end side of the base 66. Engaging claws 80 on both the ends of the phase shift rectifying member 79 engage with engagement openings 81 of the base 66. Moreover, the phase shift rectifying member 79 is energized by a spring 82 in a direction in which the phase shift rectifying member 79 springs out.

Figure 19:
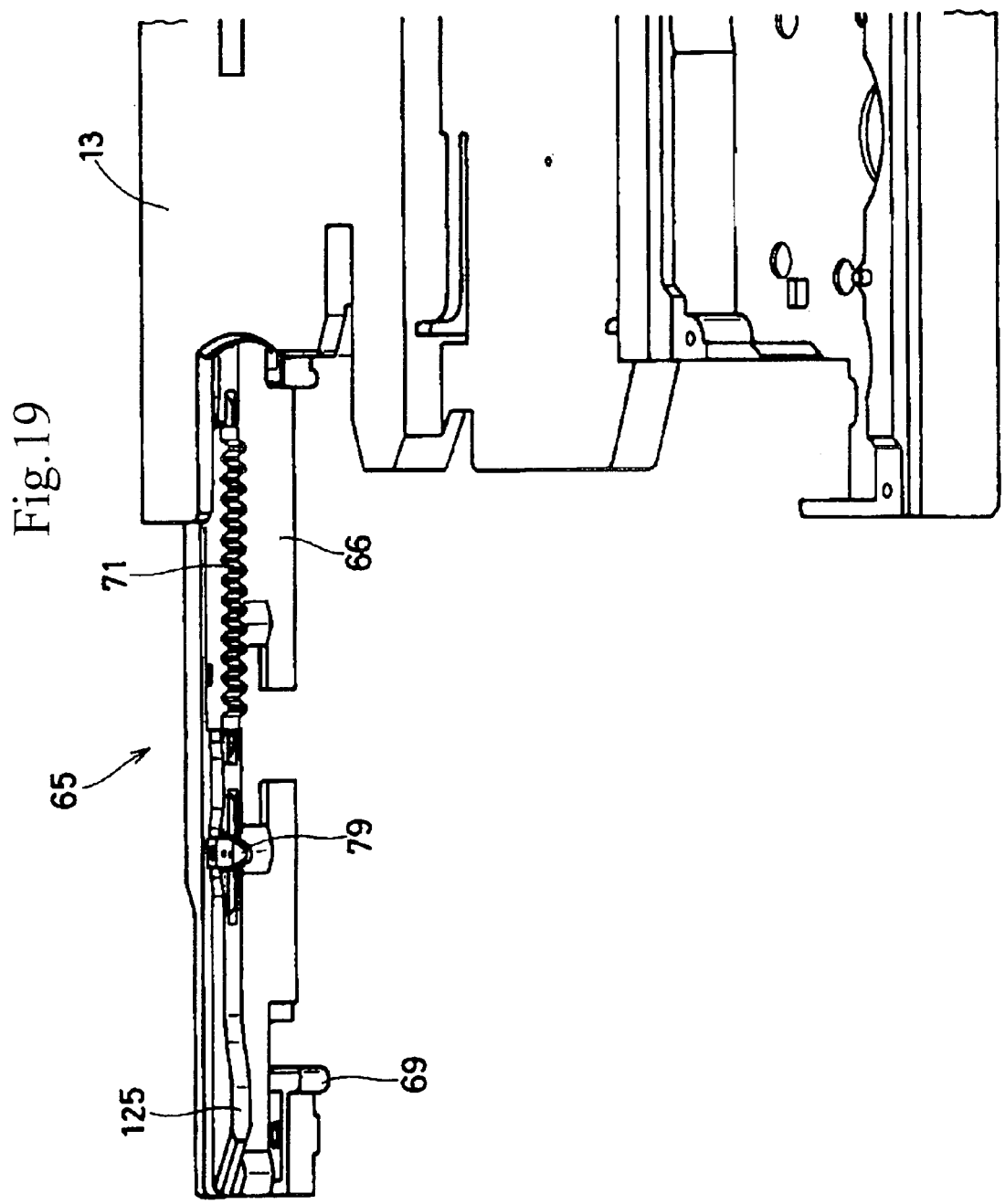
FIG. 19 is a perspective view showing an installation operation of the shutter opening and closing mechanism to the bottom of the tray.
Figure 20:
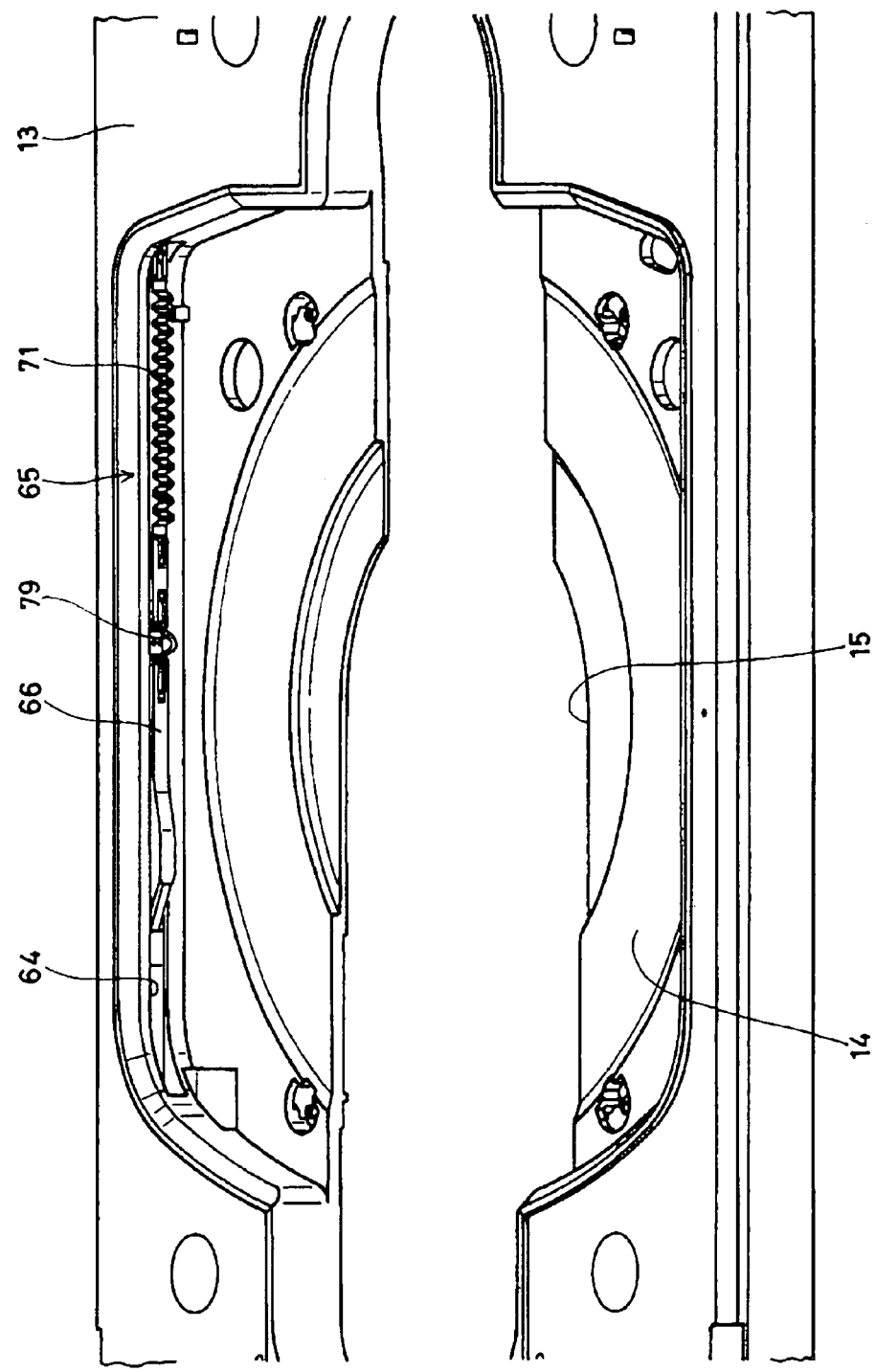
FIG. 20 is a perspective view of the tray in which the shutter opening and closing mechanism is drawn into the lower side.
Figure 21:
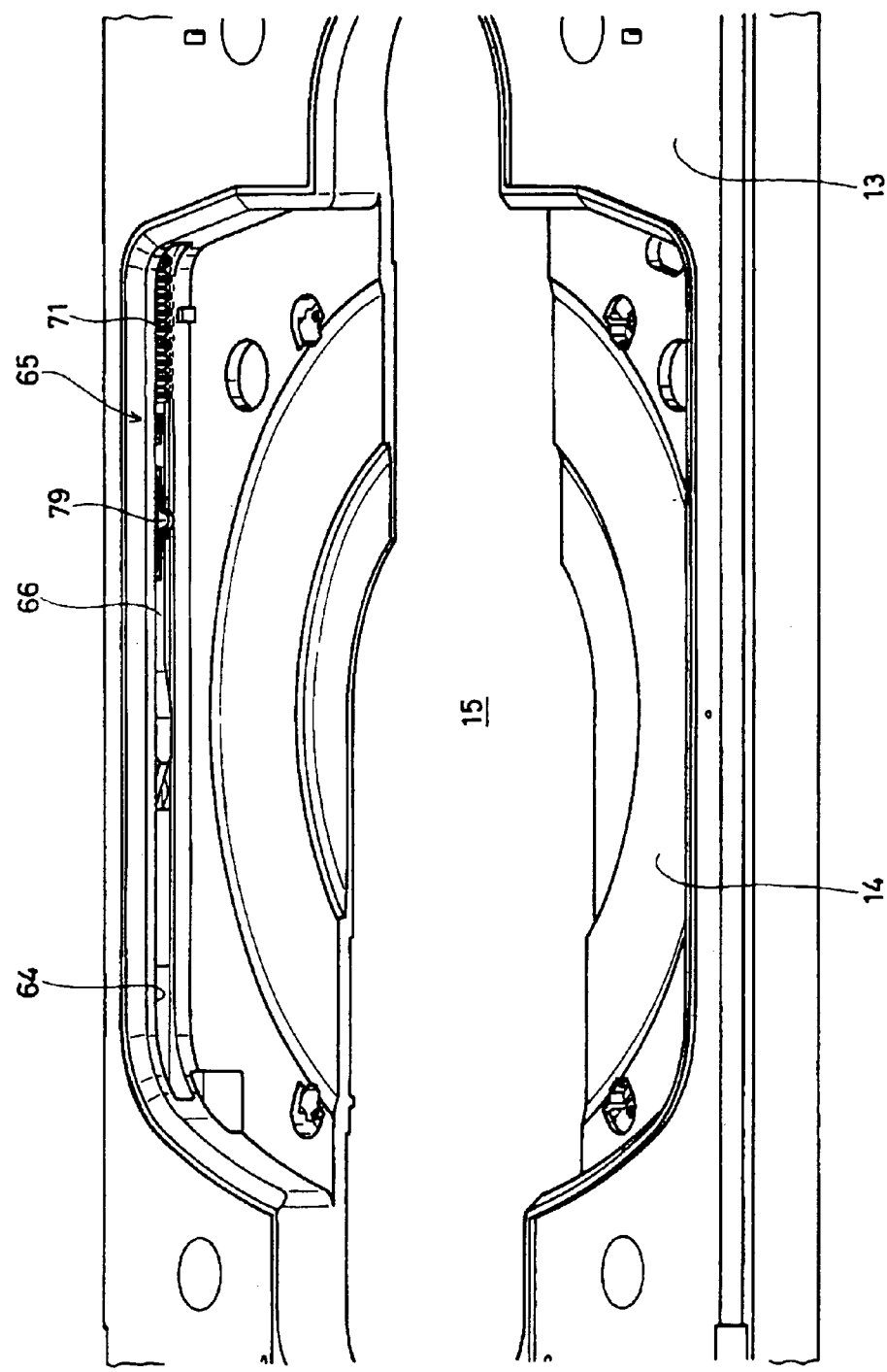
FIG. 21 is a perspective view of a state in which the shutter opening and closing mechanism has receded.
Figure 22:
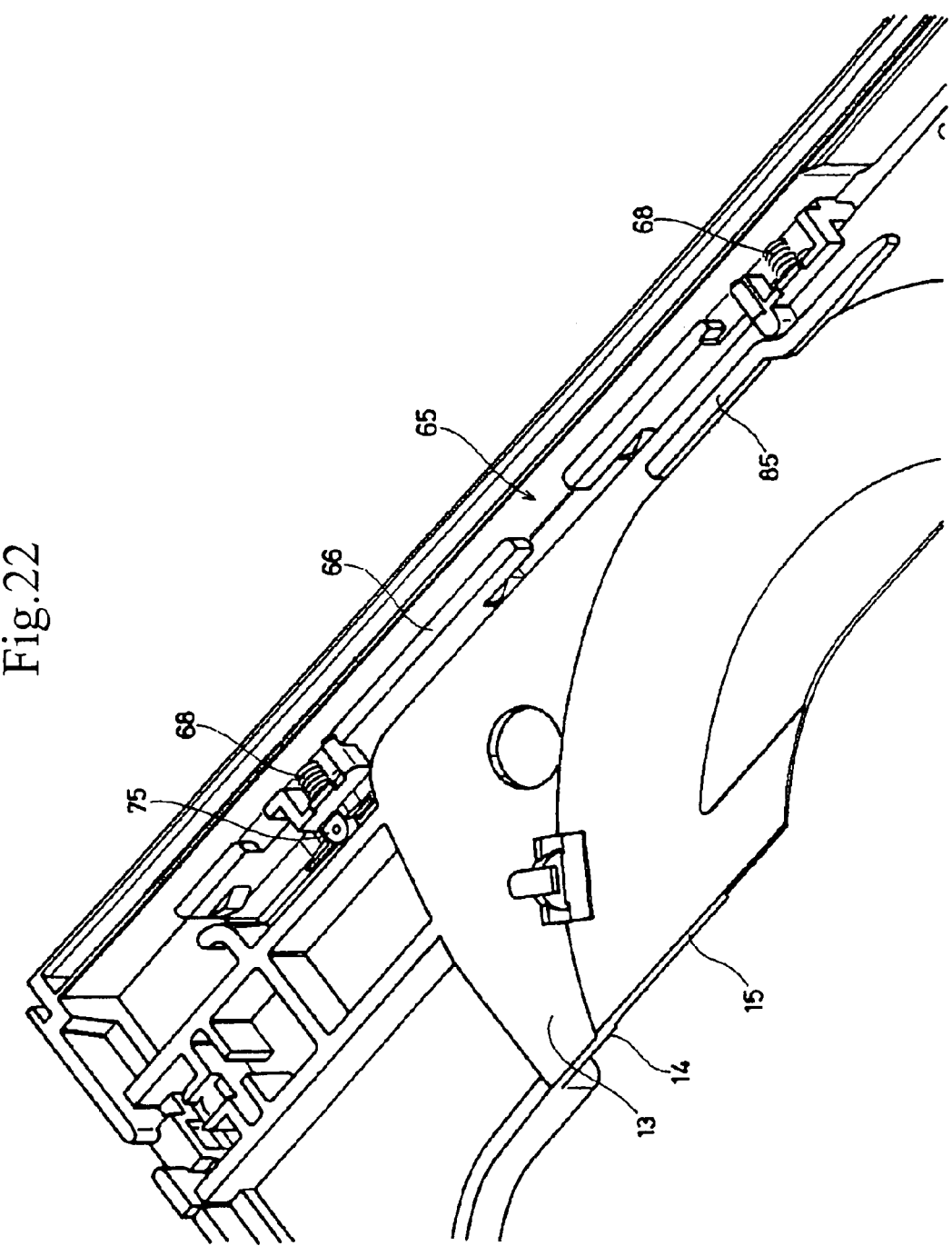
FIG. 22 is a perspective view of a main portion showing the bottom of the tray.

The shutter opening and closing mechanism 65 provided with the rack 71 and the phase shift rectifying members 75, 79 on such an opening and closing base 66 is fitted on the chucking slider 56 as shown in FIG. 13. The shutter opening and closing mechanism 65 also enters below the tray 13 in accordance with the movement of the tray 13 as shown in FIG. 19. The shutter opening and closing mechanism 65 is further adapted so that the rack 71 and the phase shift rectifying members 75, 79, all being provided on the opening and closing base 66, face inside of the recess 14 of the tray 13 through a slit 64 of the tray 13 as shown in FIG. 20 and FIG. 21. Thereby, the shutter opening and closing mechanism 65 is configured to access the DVR cartridge 51.

On the under surface of the tray 13, as especially shown in FIG. 22 to FIG. 25, a cam 85 and a stopper 86 are severally formed to face a sliding position of the shutter opening and closing mechanism 65. The cam 85 operates so as to separate the shutter opening and closing mechanism 65 from the cartridge 51. On the other hand, the stopper 86 is conversely adapted to press the shutter opening and closing mechanism 65 to approach the cartridge 51.

Figure 26:
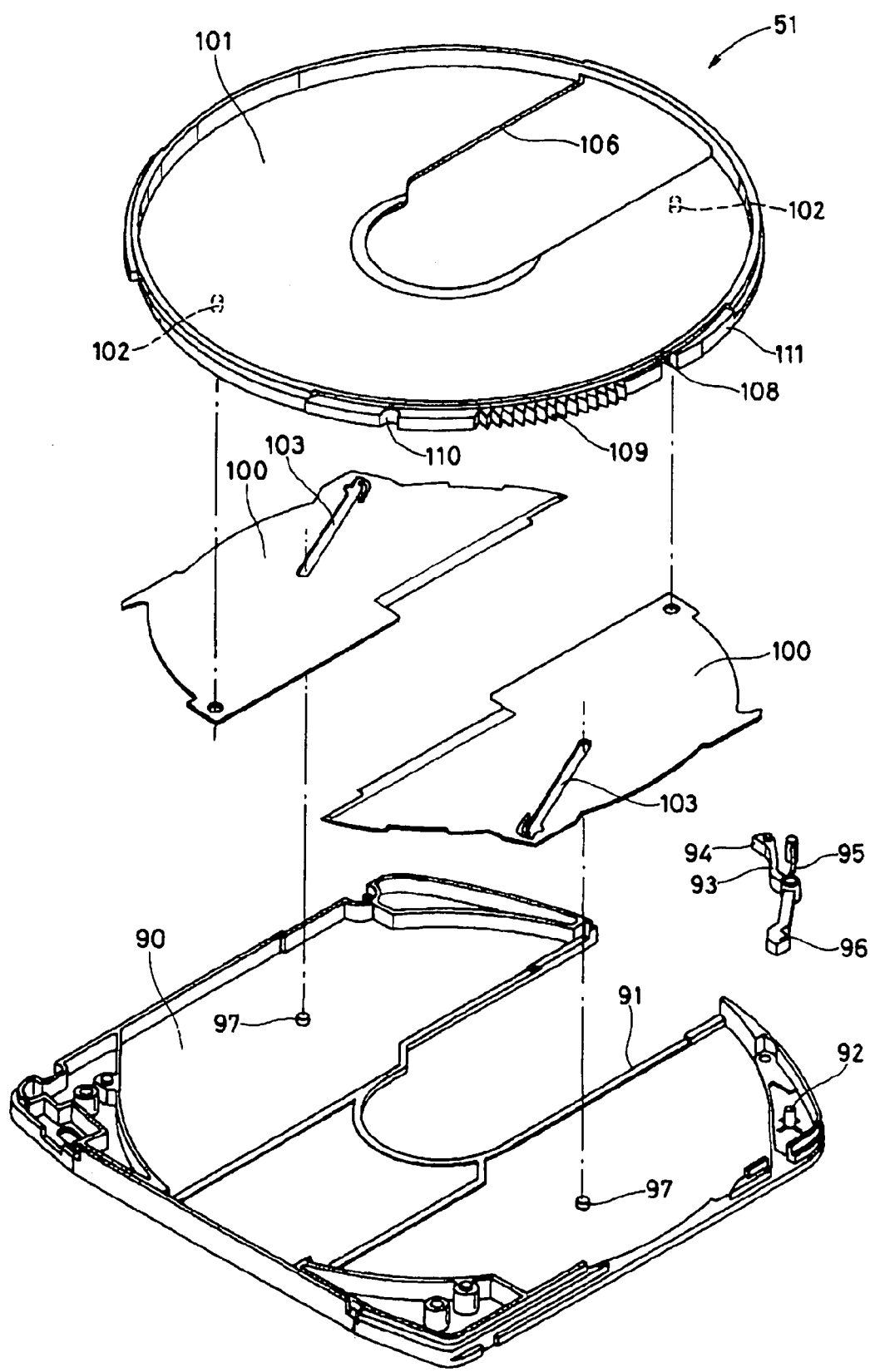
FIG. 26 is a perspective view of a main portion showing a shutter supporting mechanism of the cartridge for a DVR.

Next, a description will be given to the structure of the shutter of the DVR cartridge 51, which is opened and closed with the above-mentioned shutter opening and closing mechanism 65. FIG. 26 shows the configuration of a lower side portion of the cartridge 51 below a storage portion of a disc-like recording medium. The lower side portion of the case of the cartridge 51 is composed of a lower shell 90. An opening 91 enabling the DVR pickup 32 to access the disc-like recording medium is formed in the lower shell 90.

Moreover, a pin 92 is implanted in a side part on one side of the opening 91 of the lower shell 90. By the pin 92, a lock lever 93 is supported to be freely opened and closed. The lock lever 93 is provided with a locking portion 94 and an elastic piece 95 at one end of the lock lever 93. On the other hand, the opposite portion thereof is formed as a portion to be pressed 96. The lock lever 93 like this is especially adapted so that the locking portion 94 thereof locks an inner shell, which will be described later. Moreover, a pair of opening and closing pins 97 is provided on the upper surface of the lower shell 90.

Figure 27:
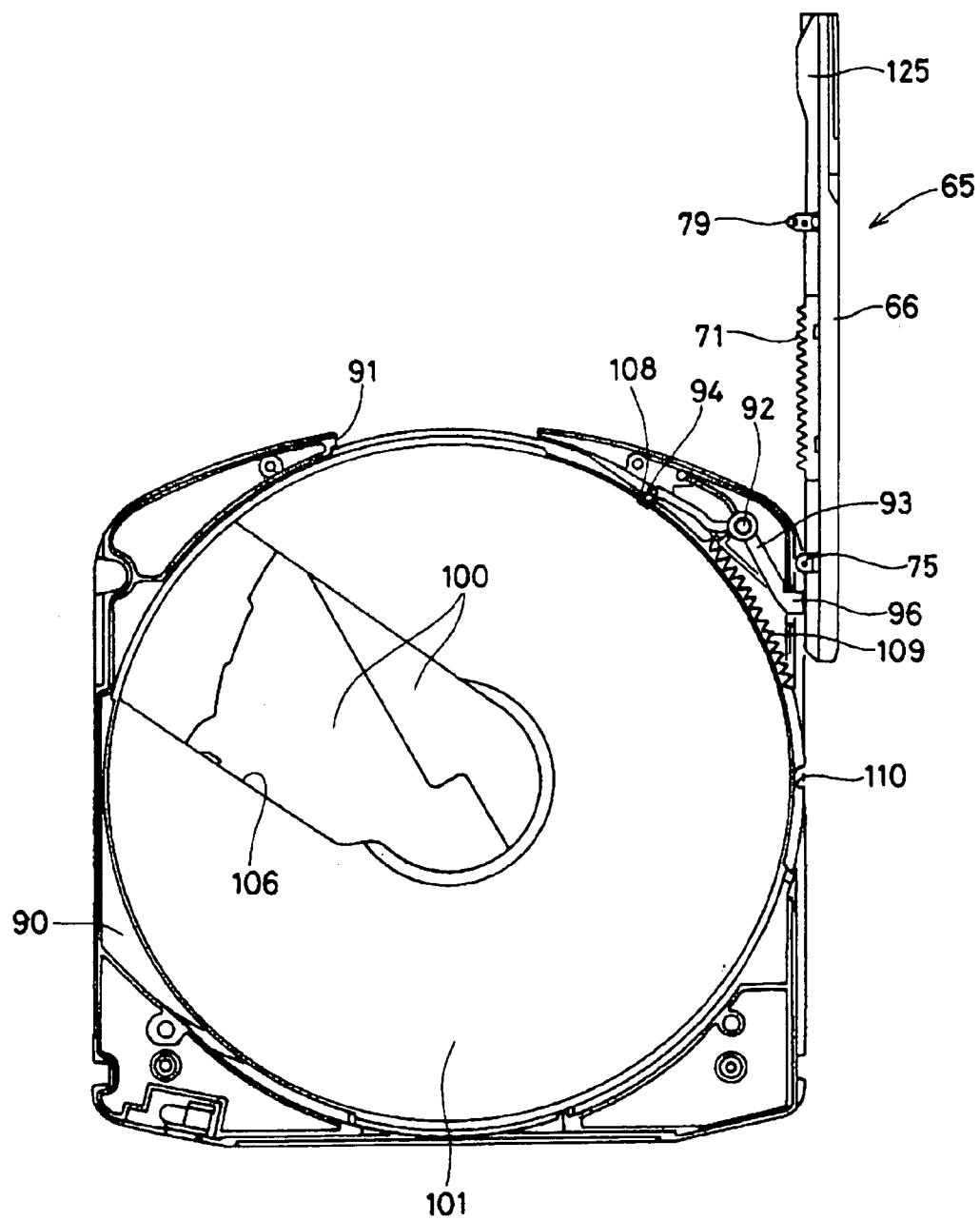
FIG. 27 is a plan view showing a state just before a start of a release of the shutter.

A pair of shutter plates 100 is arranged above the lower shell 90 like this. The shutter plates 100 are severally supported to swing freely on the under surface of the inner shell 101 through pivot pins 102. Moreover, a slit 103 is formed in each of the shutter plates 100. These slits 103 engage with the opening and closing pins 97 on the surface of the lower shell 90. Thereby, opening and closing operations of the shutter plates 100 are performed while interlocking with a rotation of the inner shell 101. That is, the shutter plates 100 are adapted to release the opening 91 by moving as shown in FIG. 27 to FIG. 36 when the inner shell 101 performs a rotation operation above the lower shell 90. When the inner shell 101 is rotated in a reverse direction, the opening 91 is closed with the shutter plates 100 as shown in FIG. 36 to FIG. 27.

An opening 106, which is adjusted to approximately match the opening 91 of the lower shell 90, is formed in the inner shell 101, which performs a rotation operation on the lower shell 90. Moreover, a portion to be locked 108 is formed on a rib on an outer periphery portion of the inner shell 101. A segment gear 109 is formed at a position shifted from the portion to be locked 108 by a little distance in a circumferential direction. Furthermore, an engaging recess 110 is formed at a position shifted from the segment gear 109 by a predetermined angle. The shutter opening and closing mechanism 65 performs a sliding operation relatively to the cartridge 51 while accessing the portion to be locked 108, the segment gear 109 and the engaging recess 110. Thereby, opening and closing operations of the shutter plates 100 are performed.

Figure 37:
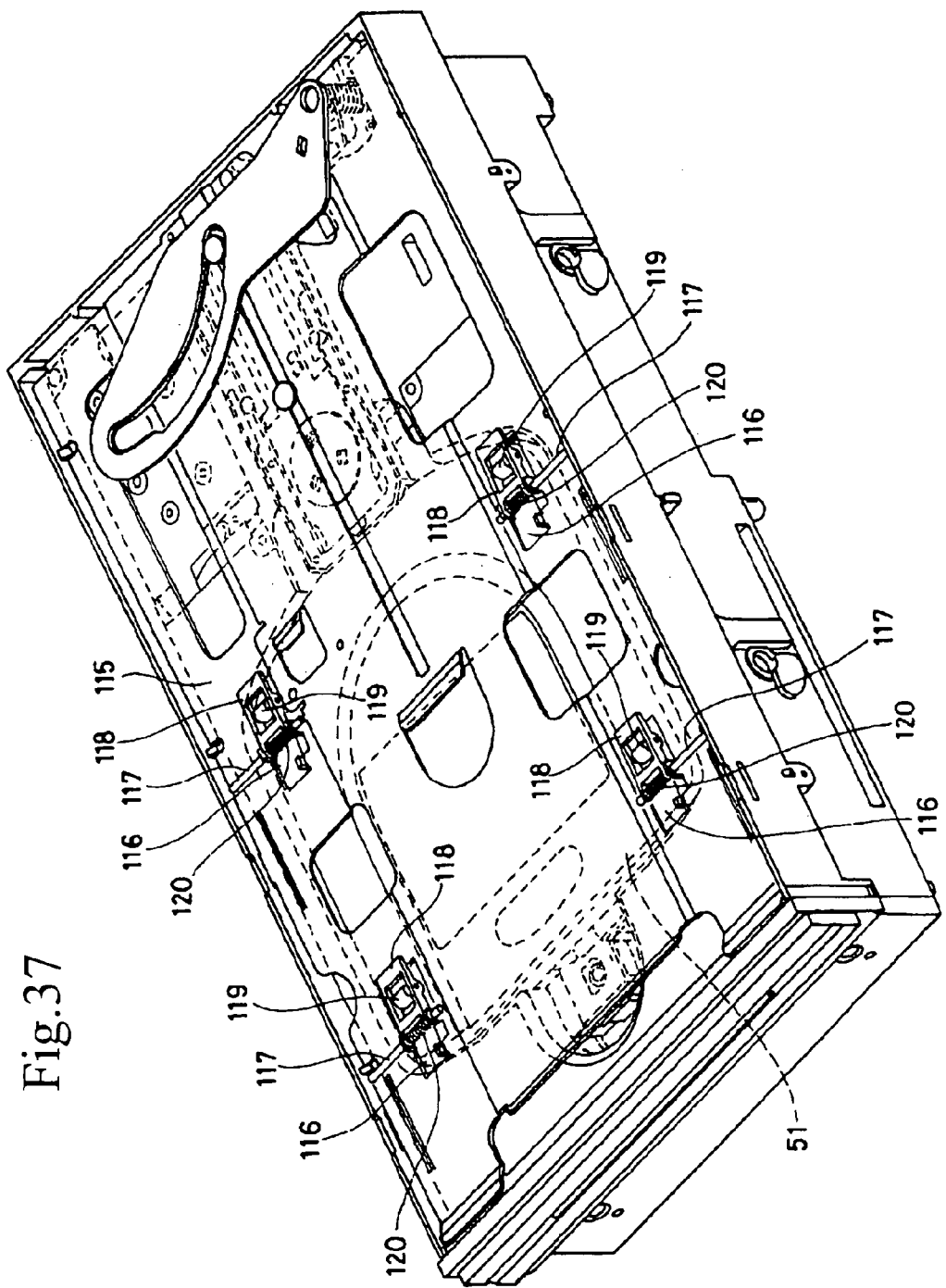
FIG. 37 is a perspective view of the whole apparatus showing a main portion of a pressing mechanism of the cartridge.
Figure 38:
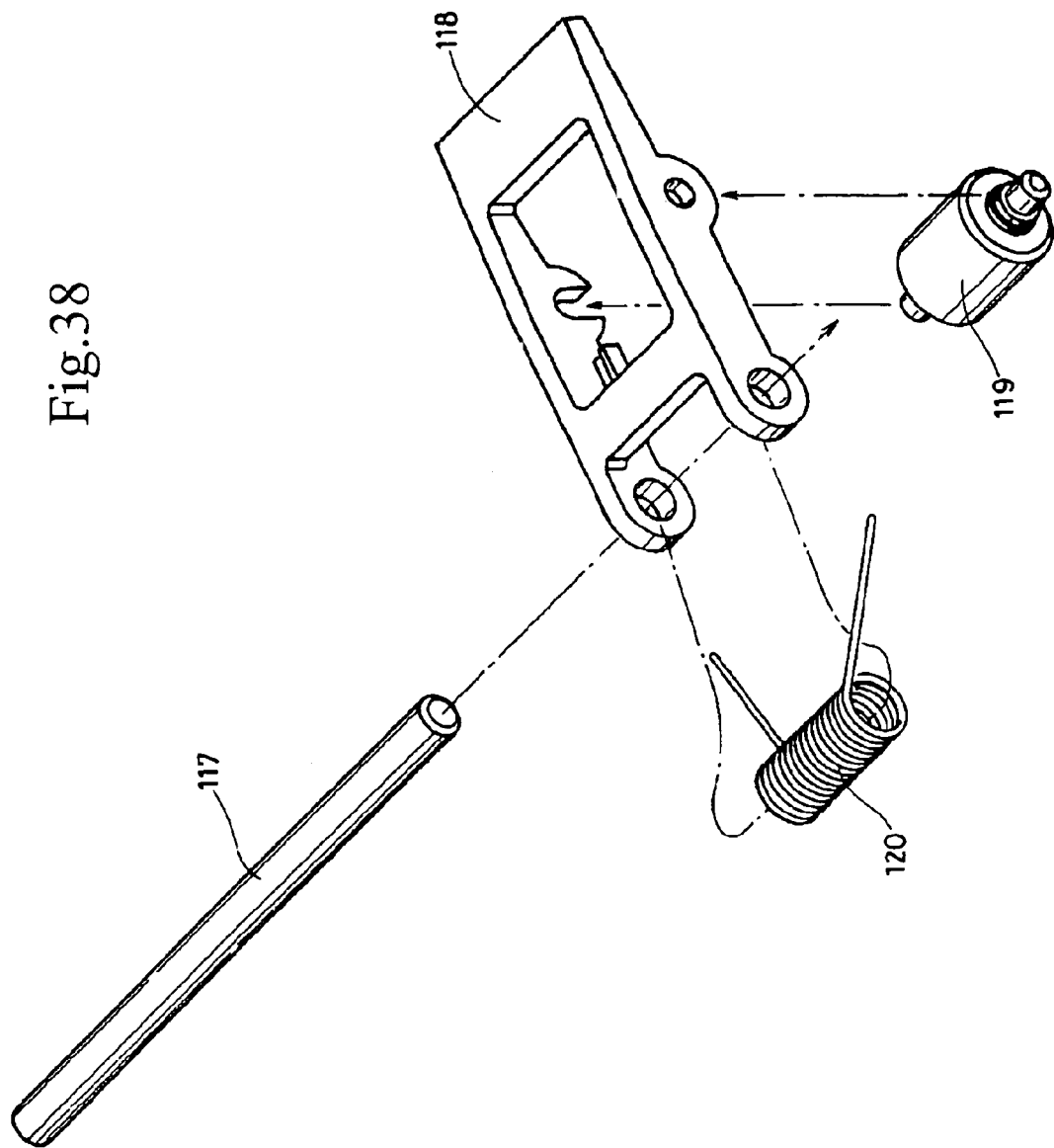
FIG. 38 is an exploded perspective view of the pressing mechanism.

Next, a description will be given to a mechanism used in order that an upper part may press an upper shell of the DVR cartridge 51 at the recording and reproducing position when the DVR cartridge 51 is loaded into the recording and reproducing position by the tray 13 as shown in FIG. 37. A holder plate 115 shown in FIG. 37 is fitted to be placed above the tray 13. A small opening 116 is severally formed in the holder plate 115 at positions corresponding to four corners of the DVR cartridge 51. Also, a pressing mechanism as shown in FIG. 38 is severally fitted to these openings 116.

The pressing mechanism is composed of a pin 117 fitted to cross the opening 116 of the holder plate 115, a pressing lever 118 supported by the pin 117 to swing freely, a pressing roller 119 fitted to the pressing lever 118 in a state capable of rotating freely, and a coil spring 120 energizing the pressing lever 118 to swing it for applying a pressing force to the pressing roller 119.

When the base unit 25 shown in FIG. 39A is raised by means of the cam grooves 59 of the chucking sliders 56 as shown in FIG. 39B, the cartridge 51 introduced by the tray 13 is supported by the support rods 45 and the support arms 46. At this time, the pressing rollers 119 fitted to the pressing levers 118 above the holder plate 115 press the top surface of the cartridge 51 at four points with a light pressure.

(2) Descriptions of Operations

Figure 7:
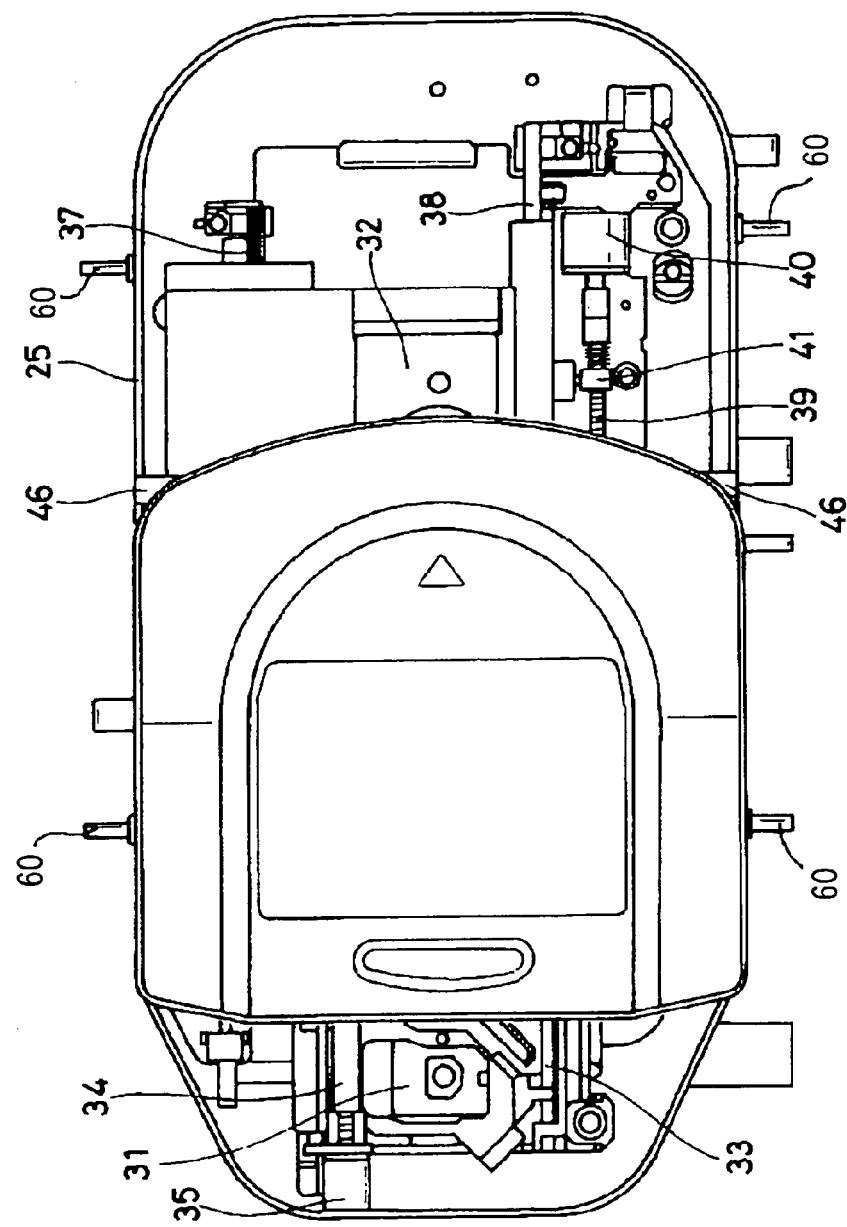
FIG. 7 is a plan view of the base unit mounting a cartridge for a DVR.
Figure 8:
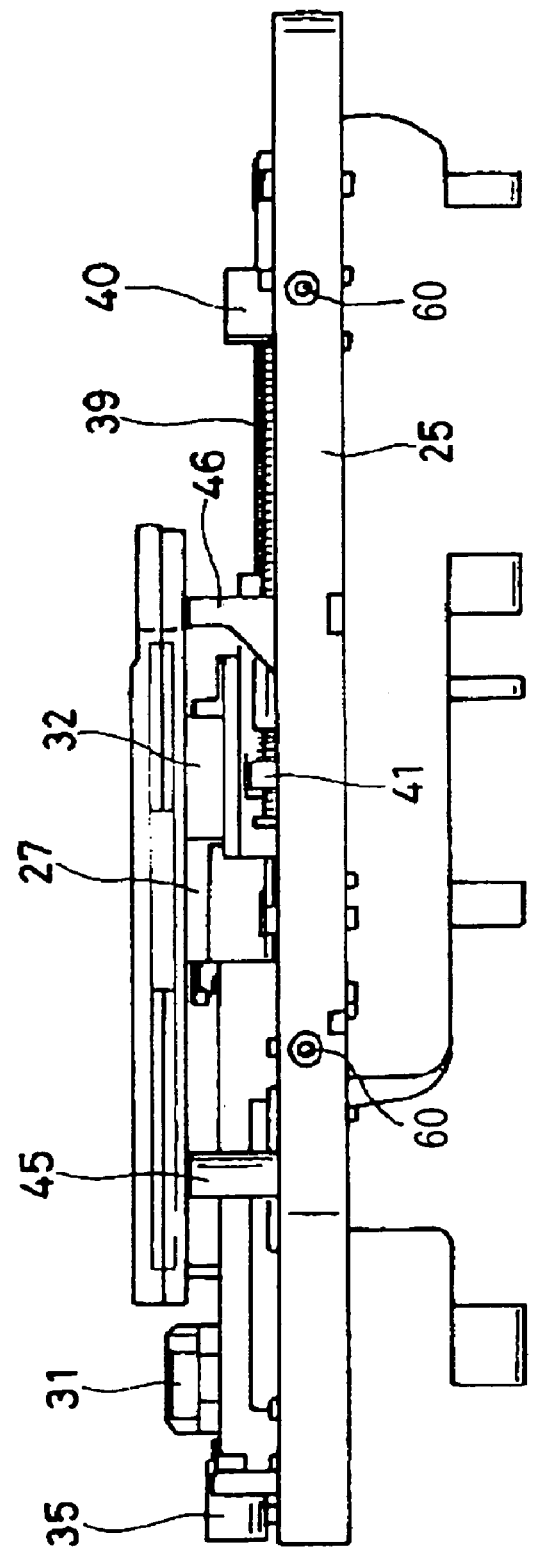
FIG. 8 is a side view of the same base unit.
Figure 9:
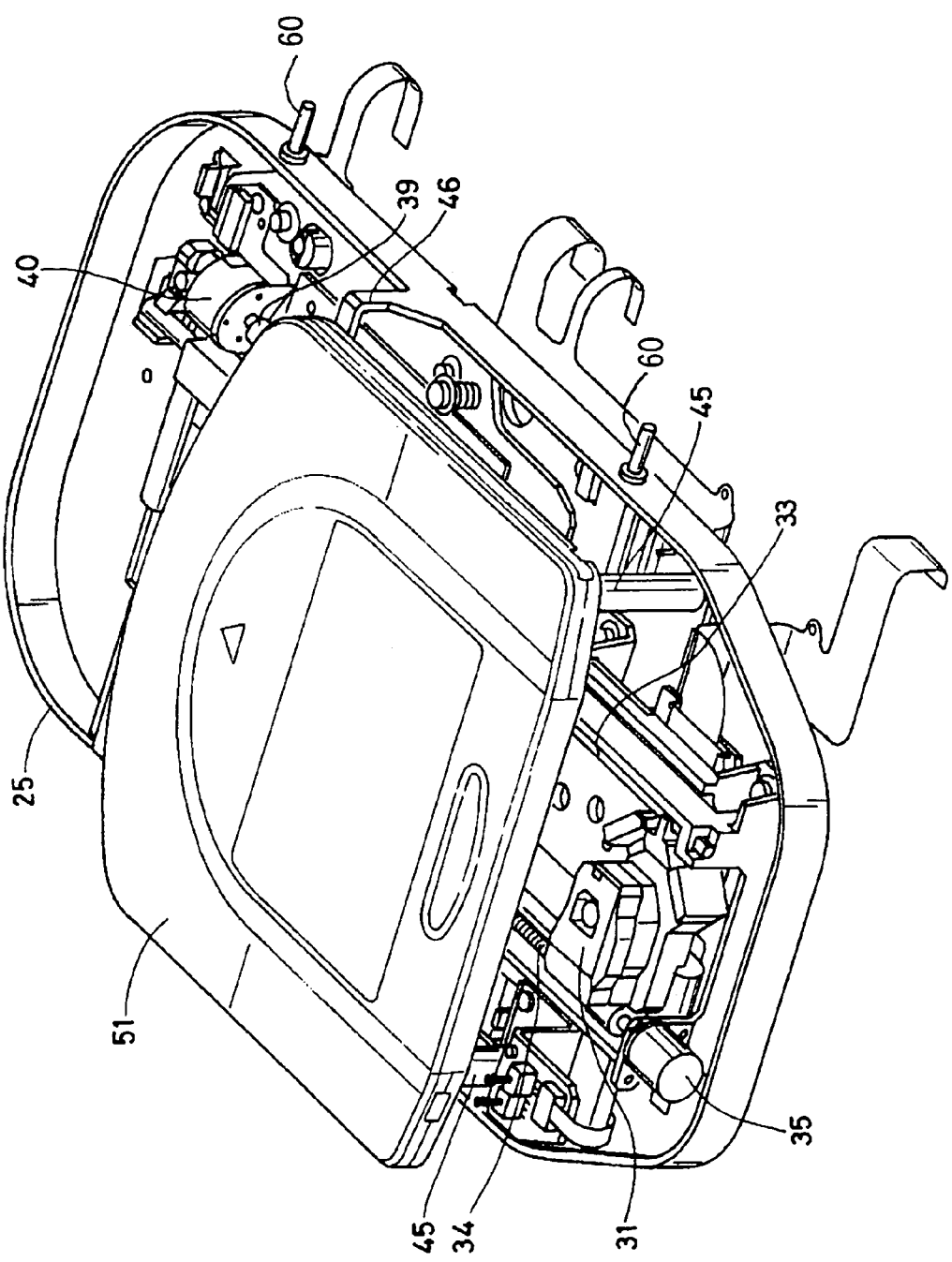
FIG. 9 is a perspective view of the same base unit.

Next, a description will be given to operations of the recording and reproducing apparatus configured as above. When the tray 13 shown in FIG. 2 is drawn into the external housing 10 in the state in which the DVR cartridge 51 is placed in the recess 14 of the tray 13, the DVR cartridge 51 is mounted on the apparatus as shown in FIG. 7 to FIG. 9. At this time, the DVD pickup 31 is retracted to a part on the front side of the tray 13 and on the outer periphery side of the DVR cartridge 51 by the stepping motor 35 and the feed screw 34. At this time, the DVR cartridge 51 is supported by both the pair of support rods 45 and the pair of support arms 46 on the base unit 25. Any of these rods 45 and arms 46 are located above the recess 14 of the tray 13 through the openings 47, 48 of the tray 13 in accordance with the rising operation of the base unit 25 to locate the DVR cartridge 51 correctly.

Figure 10:
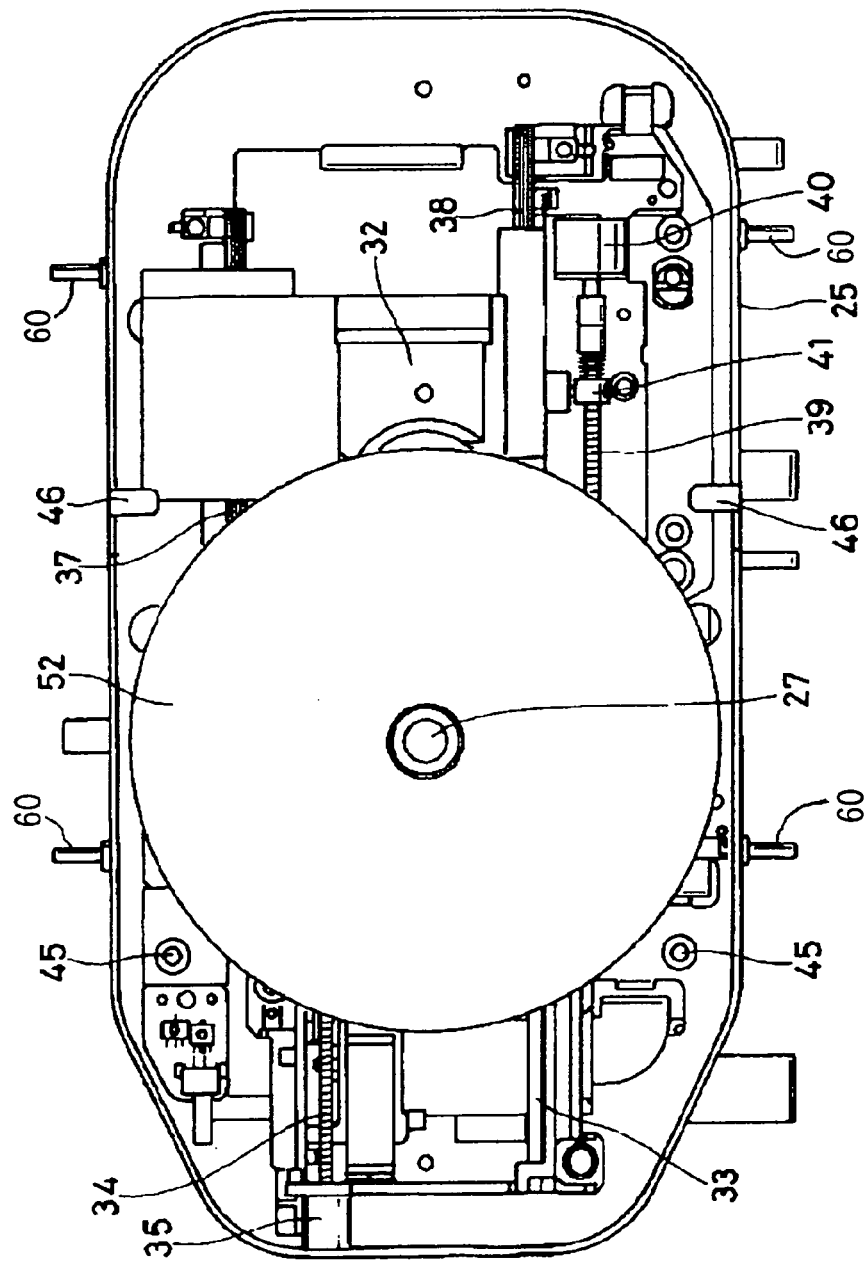
FIG. 10 is a plan view of the base unit mounting a bare disc.
Figure 11:
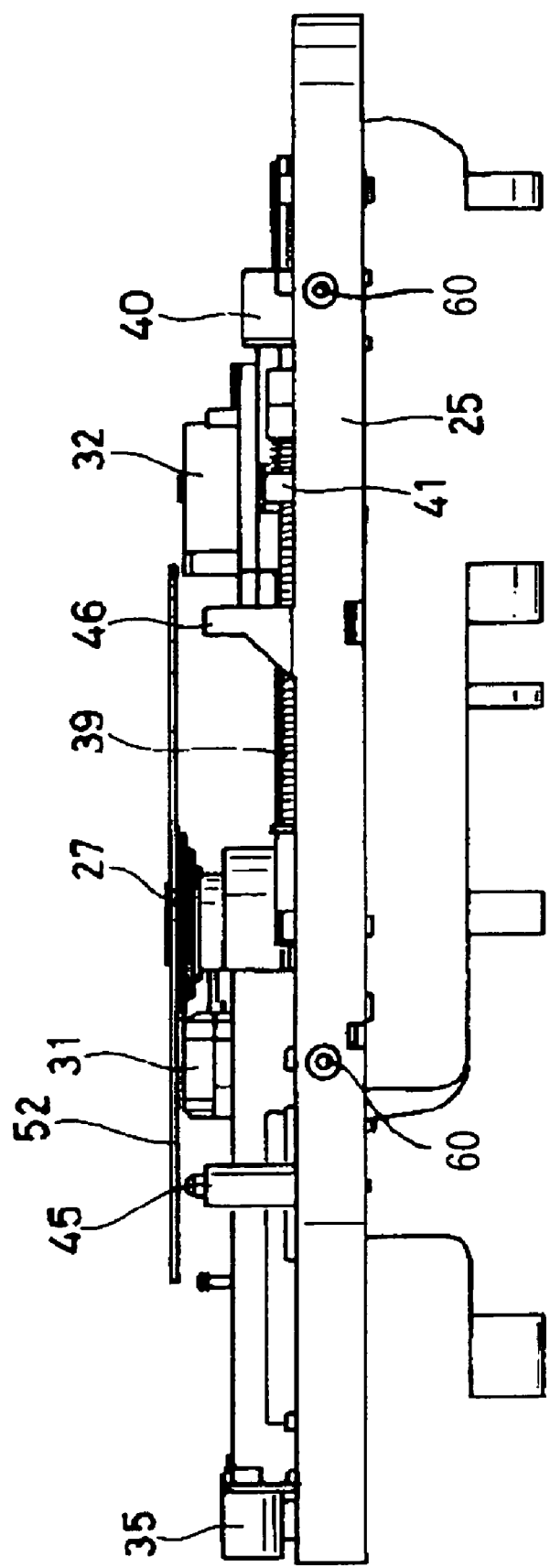
FIG. 11 is a side view of the same base unit.
Figure 12:
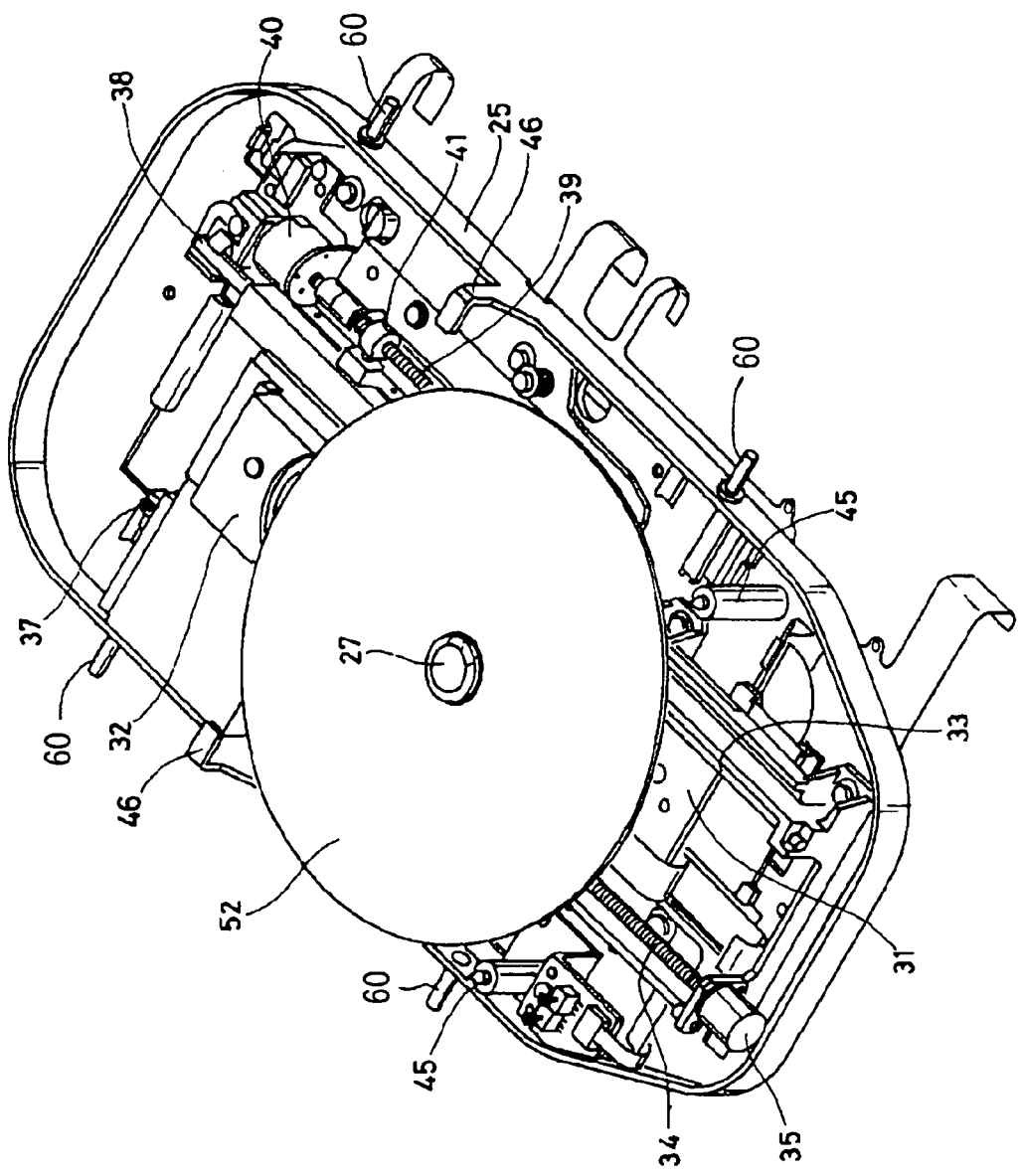
FIG. 12 is a perspective view of the same base unit.

On the other hand, in a case where a bare disc 52 is placed on the recess 14 of the tray 13, the tray 13 is drawn into the external housing 10. At this time, the position relationship of the bare disc 52 on the base unit 25 is like ones shown in FIG. 10 to FIG. 12. That is, in this case, the feed screw 39 retracts the DVR pickup 32 to a deeper part of the tray 13 by means of the stepping motor 40. That is, the DVR pickup 32 is located on the outer periphery side of the bare disc 52 with regard to the bare disc 52. In other words, the mechanism is configured to retract the DVR pickup 32 lest at least the lens section of the DVR pickup 32 should enter into the inside of the projected area of the bare disc 52. Then, the DVD pickup 31 is located on the under surface of the bare disc 52 by means of the stepping motor 35 through the feed screw 34. In such a state, the bare disc 52 is driven to rotate by the turntable 27, and recording and/or reproducing are performed to the bare disc 52.

As described above, the recording and reproducing apparatus of the present embodiment is one capable of using disc-like recording media in two formats for the DVD/CD and the DVR, both incompatible to each other. Hereupon, the base unit 25 is formed with a sheet metal or a resin, and is provided in the housing 10 of this apparatus. Then, the DVD/CD optical pickup 31 is arranged on a near side or the front side on the base unit 25, and the DVR optical pickup 32 is arranged on the rear side. On the other hand, a single motor is commonly used as one for rotating optical discs and as one for driving the turntable 27. The two kinds of the optical pickups 31, 32 are arranged at positions shifted by 180 degrees in the circumferential direction of the turntable 27 around the turntable 27 as a center thereof, and the optical pickups 31, 32 severally freely moves in radial directions of the optical disc. Incidentally, it is adapted to be possible to tilt the two kinds of the optical pickups 31, 32 and to perform their position adjustment severally independently.

Hereupon, as for the DVR pickup 32 being an optical pickup in a format for a high density recording, which is easily affected especially by dust having a possibility of entering into the apparatus, the DVR pickup 32 is arranged in the rear of the base unit 25 to be located at the rear side in the external housing 10 for realizing a measure to the dust. Incidentally, hereupon, if at least any one of a main shaft or a countershaft of the guides 33, 37 and 38, on which the two kinds of the optical pickups 31, 32 move, is commonly used as another one, the reduction of the number of parts can be achieved.

Moreover, the apparatus is provided with the guide rods 37, 38 for the movement of the pickup for a DVR 32 in order that the pickup for a DVR 32 may move in the same plane to the direction opposite to the turntable 27 so as not to collide with the bare disc 52, in a case of using the bare disc 52 composed of a DVD/CD in the apparatus. These guide rods 37, 38 are parts necessary for allowing the DVR pickup 32 to access to the DVR cartridge 51 to make the optical disc in the cartridge move the radial direction. The retract mechanism of the DVR pickup 32 is completed only by elongating the lengths of the guide rods 37, 38 a little.

Meanwhile, if the DVR cartridge 51 is used, the lengths of the guide rod 33 and the feed screw 34 are elongated in order that the DVD/CD pickup 31 may move to the opposite outer periphery side of the turntable 27 lest the DVD/CD pickup 31 should interfere with the DVR cartridge 51. The guide rods 37, 38 and the feed screw 34 are parts necessary for allowing the DVD pickup 31 to access to the bare disc 52. The retract of the DVD pickup 31 is made to be possible only by elongating the lengths of the guide rods 37, 38 and the feed screw 34 a little.

Incidentally, in the present embodiment, the pair of optical pickups 31, 32 is arranged at the positions shifting by 180 degrees to the circumferential direction of the turntable 27 and at the front side and the rear side of the base unit 25. However, the arrangement relationship of the two kinds of the optical pickups 31, 32 is not necessarily to be opposed to form an angle of 180 degrees. That is, the two pickups 31, 32 may be arranged to be movable in orthogonal directions forming an angle of 90 degrees. Alternatively, it is further possible to set the angle at which the movement directions of the two pickups 31, 32 cross with each other to be an arbitrary angle of 60 degrees or the like. The arrangement of the moving directions of these two kinds of optical pickups 31, 32 can suitably be selected in the relationship with the arrangement of other parts in the external housing 10 or the base unit 25.

Figure 16:
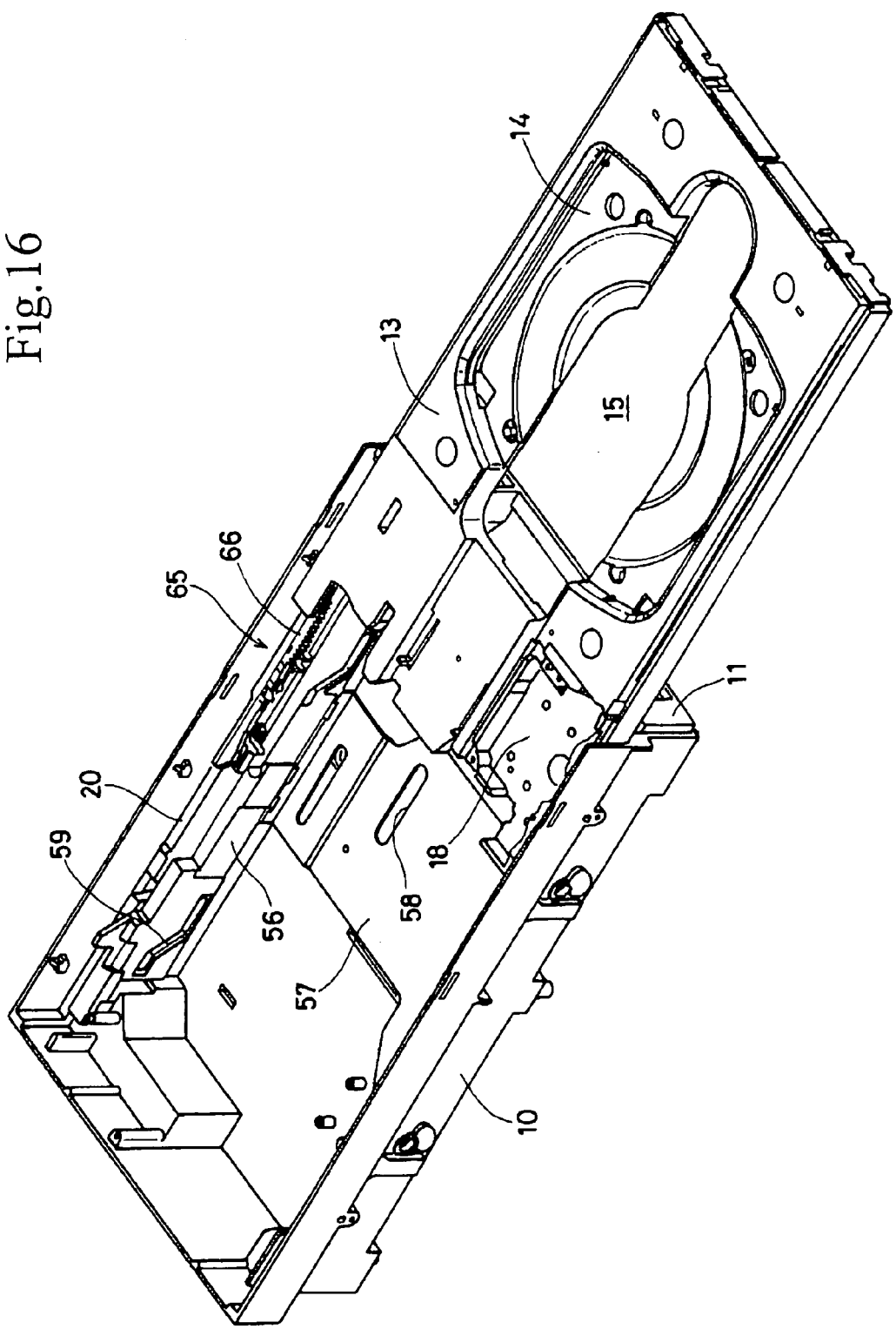
FIG. 16 is an external perspective view showing the arrangement of the shutter opening and closing mechanism in a state of pulling out its tray.
Figure 17:
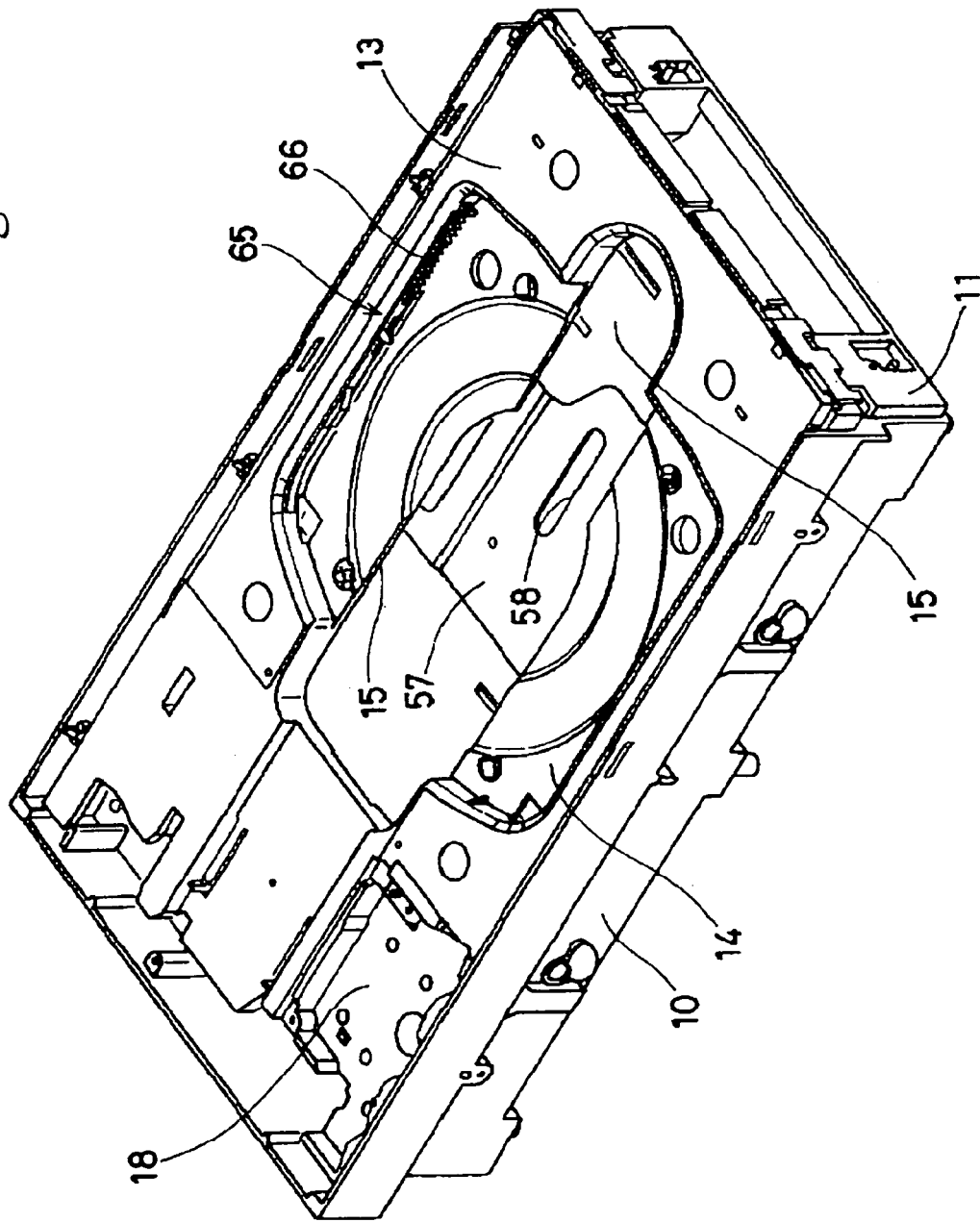
FIG. 17 is an outside perspective view showing the arrangement of the shutter opening and closing mechanism in a state of drawing in the tray.
Figure 18:
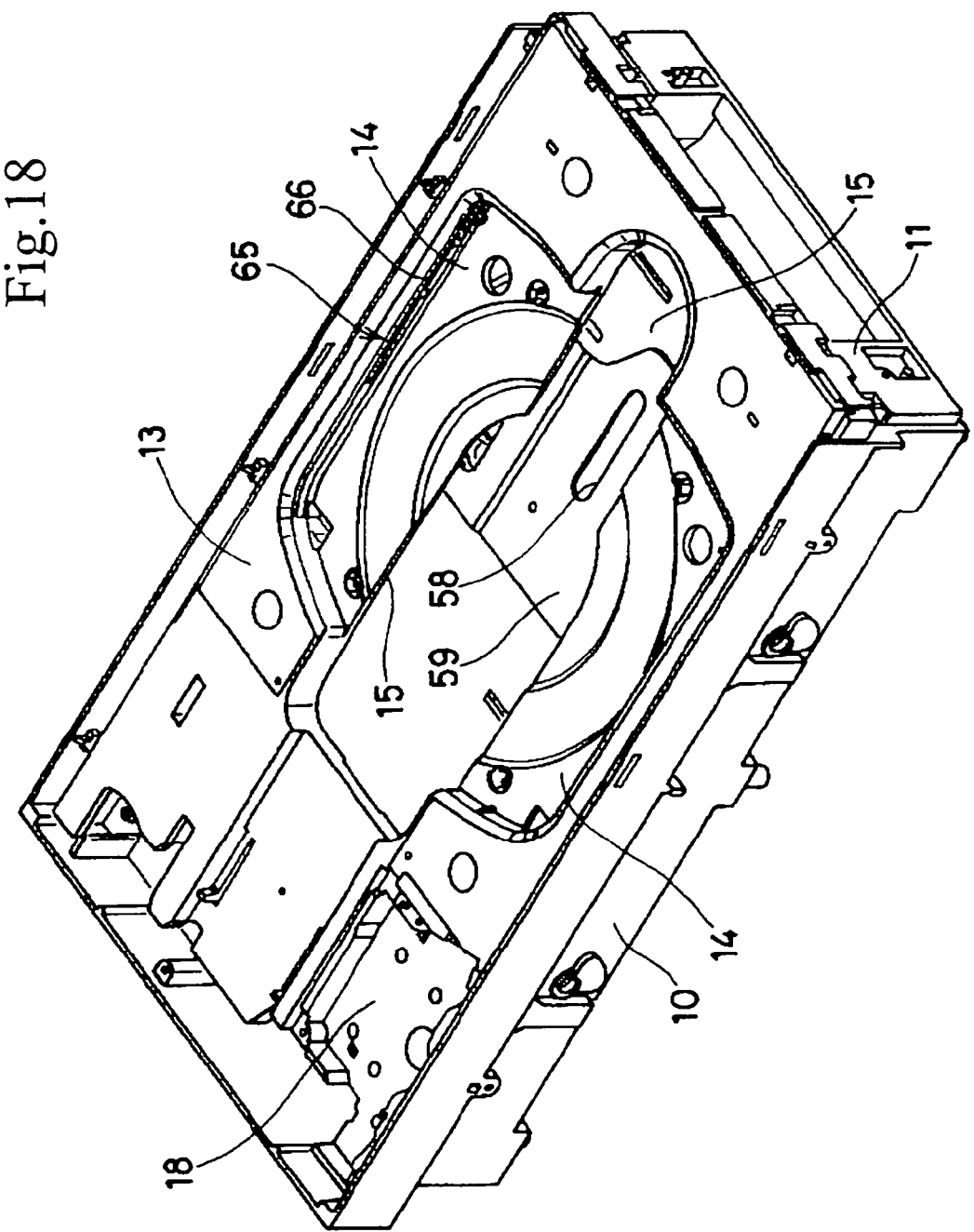
FIG. 18 is a perspective view of a state in which the shutter opening and closing mechanism has receded.

Next, a description will be given to operations of releasing the shutter plates 100 of the DVR cartridge 51 when the cartridge 51 has been loaded to be moved to the recording and reproducing position. As shown in FIG. 16, the cartridge 51 is placed in the recess 14 of the tray 13 in the state in which the tray 13 is pulled out. After that, the tray 13 is self-propelled while being driven by the drive unit 18 to be drawn into the external housing 10 as shown in FIG. 17 and FIG. 18. At this time, the shutter opening and closing mechanism 65 fitted to the upper end of the chucking slider 56 faces to the recess 14 of the tray 13 through the slit 64 of the tray 13 (see FIG. 17, FIG. 18, FIG. 20 and FIG. 21). That is, when the tray 13 is drawn in, as shown in FIG. 19, the shutter opening and closing mechanism 65 relatively enters into the lower side of the tray 13 from the rear end side of the tray 13.

Then, as the tray 13 moves to the recording and reproducing position side while being self-propelled, the shutter opening and closing mechanism 65 slides on the outer side of the slit 64 of the tray 13 as shown in FIG. 20 and FIG. 21. At this time, both of the rack 71 and the pair of phase shift rectifying members 75, 79 of the shutter opening and closing mechanism 65 face to the recess 14 through the slit 64 of the tray 13. Such a relative movement of the shutter opening and closing mechanism 65 to the tray 13 releases the shutter plate 100 of the DVR cartridge 51 to be loaded by the tray 13.

Figure 24:
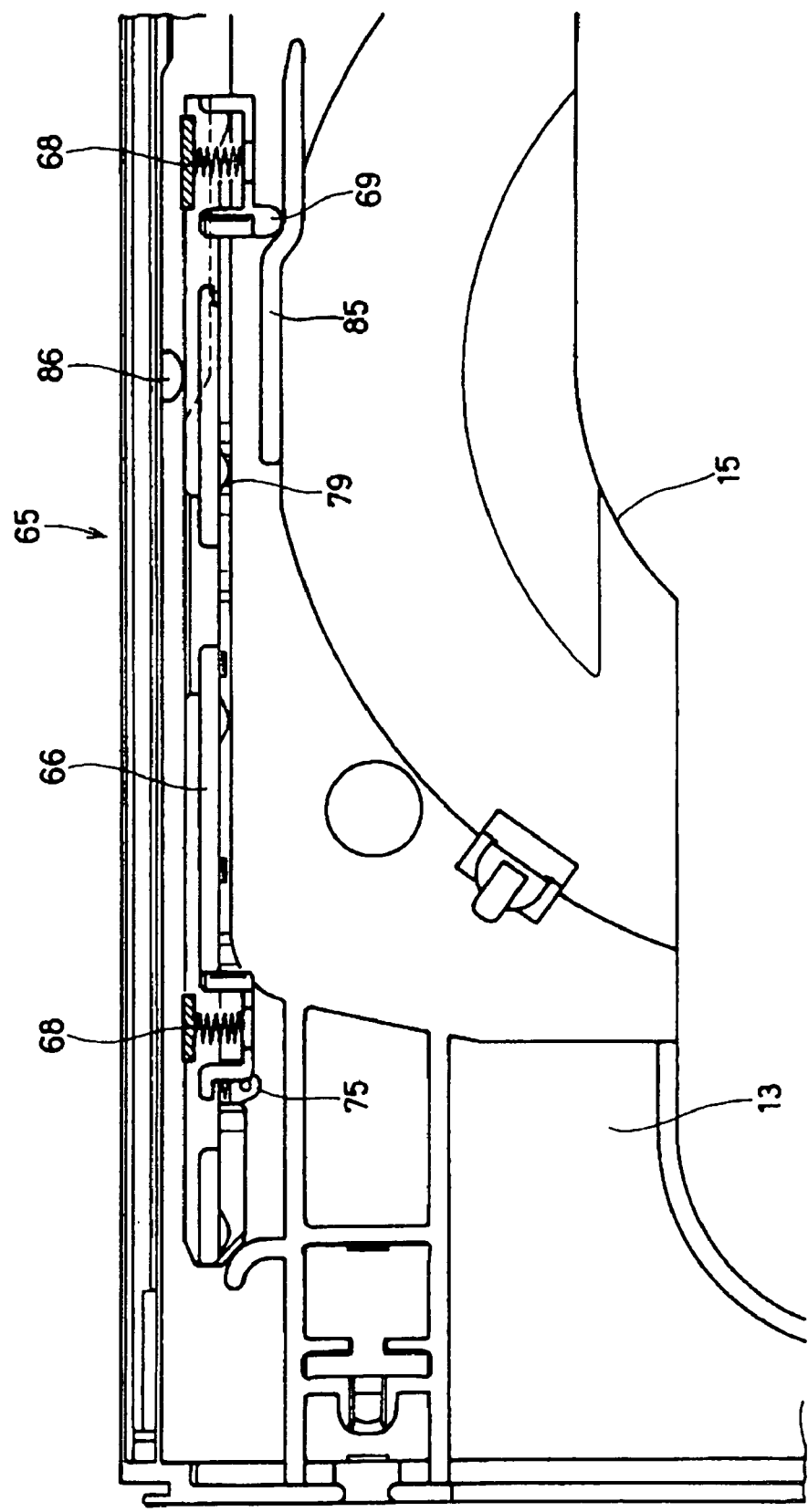
FIG. 24 is a bottom plan view of the tray showing a forward operation of the shutter opening and closing mechanism by a stopper.
Figure 25:
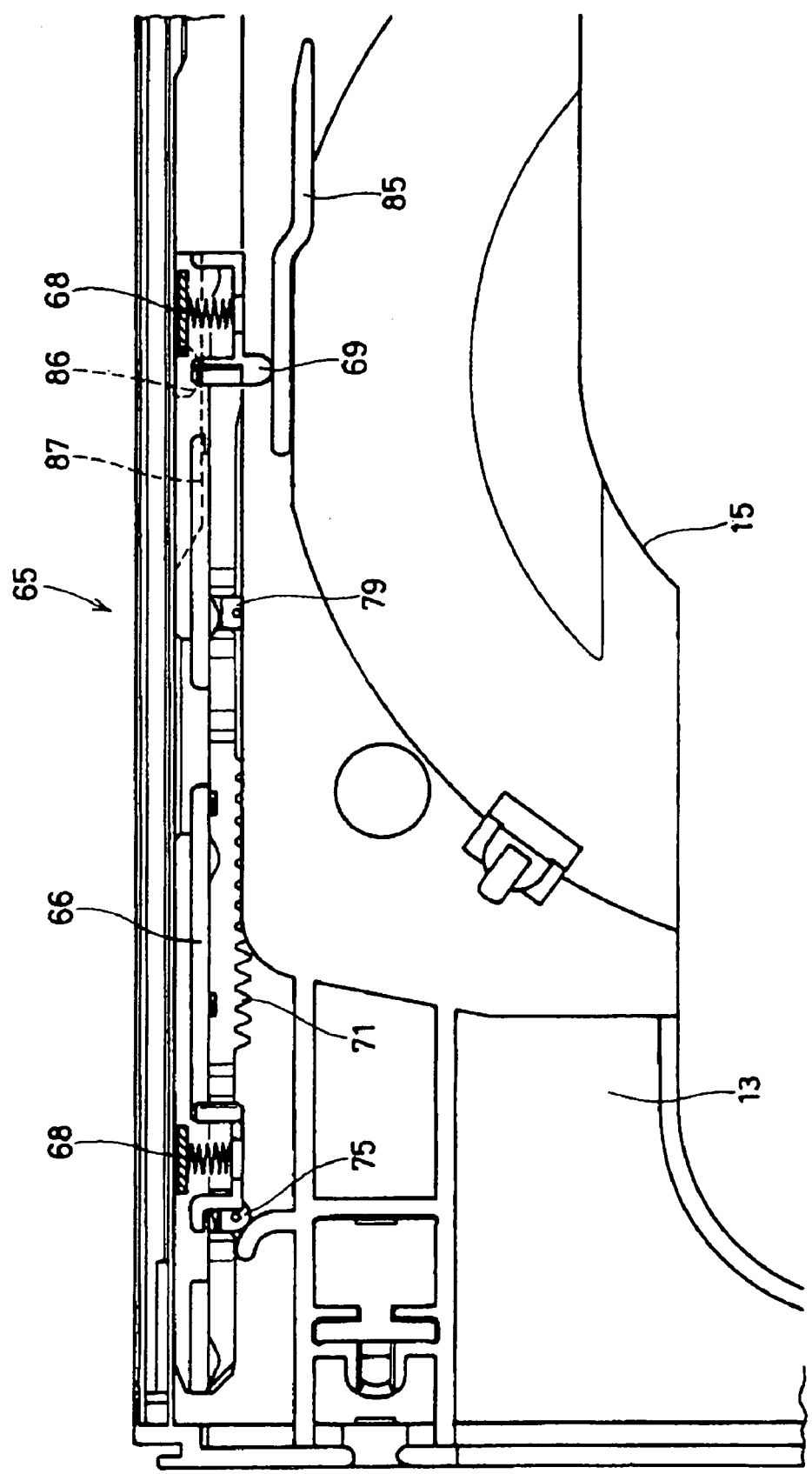
FIG. 25 is a bottom plan view of the tray showing a setback operation of the shutter opening and closing mechanism by means of a cam.

Incidentally, at the time of the opening and closing operations of the shutter plates 100 of the DVR cartridge 51 by the shutter opening and closing mechanism 65, the stopper 86 shown in FIG. 24 presses the opening and closing base 66 of the shutter opening and closing mechanism 65 from the back face side thereof. Thereby, the opening and closing base 66 is pressed to project into the recess 14 of the tray 13 through the slit 64. On the other hand, when the opening and closing operations by the shutter opening and closing mechanism 65 end, the cam 85 makes the shutter opening and closing mechanism 65 retreat as shown in FIG. 25. Thereby, the shutter opening and closing mechanism 65 retreats from the slit 64, and gets away from the recess 14 of the tray 13. Incidentally, at this time, the stopper 86 is received by a recess 87 formed on the opening and closing base 66.

Figure 28:
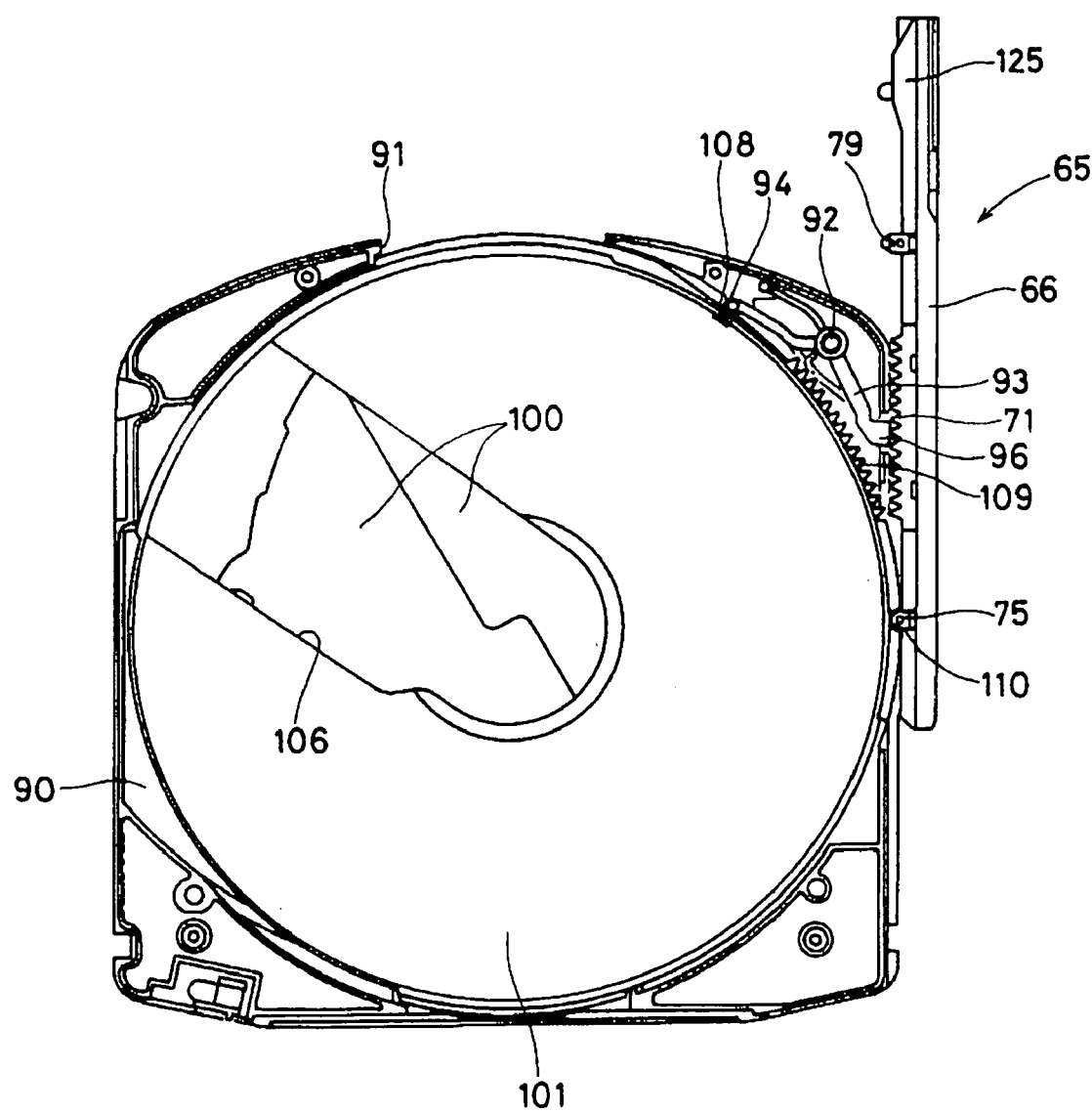
FIG. 28 is a plan view showing a release operation of the shutter.

A description will be given to concrete opening and closing operations of the shutter plates 100 of the DVR cartridge 51 by the shutter opening and closing mechanism 65 by reference to FIG. 27 to FIG. 36. When the tray 13 mounting the cartridge 51 thereon is self-propelled to be drawn into the external housing 10, the portion to be pressed 96 of the lock lever 93 is first pressed by the tip portion of the opening and closing base 66. Then, the lock lever 93 swings around the pin 92 in a clockwise direction to release the lock of the inner shell 101. Shortly after that, as shown in FIG. 27, the phase shift rectifying member 75 on the tip end side of the shutter opening and closing mechanism 65 enters into a groove portion on the side face of the cartridge 51. Then, a relative movement of the shutter opening and closing mechanism 65 engages the phase shift rectifying member 75 with the engaging recess 110 of the inner shell 101 of the cartridge 51 as shown in FIG. 28. Thereby, the inner shell 101 is rotated in the clockwise direction with regard to the lower shell 90 as shown in FIG. 29.

As shown in FIG. 26, the inner shell 101 supports the pair of shutter plates 100 to be freely opened and closed through the pivot pins 102, and the slits 103 of the shutter plates 100 are engaged with the pins 97 provided on the inner surface of the lower shell 90. Thereby, when the inner shell 101 is rotated, the shutter plates 100 severally perform a swinging movement against the inner shell 101 around the pivot pins 102 as shown in FIG. 29 to FIG. 34. Consequently, the opening 106 of the inner shell 101 is released.

Figure 29:
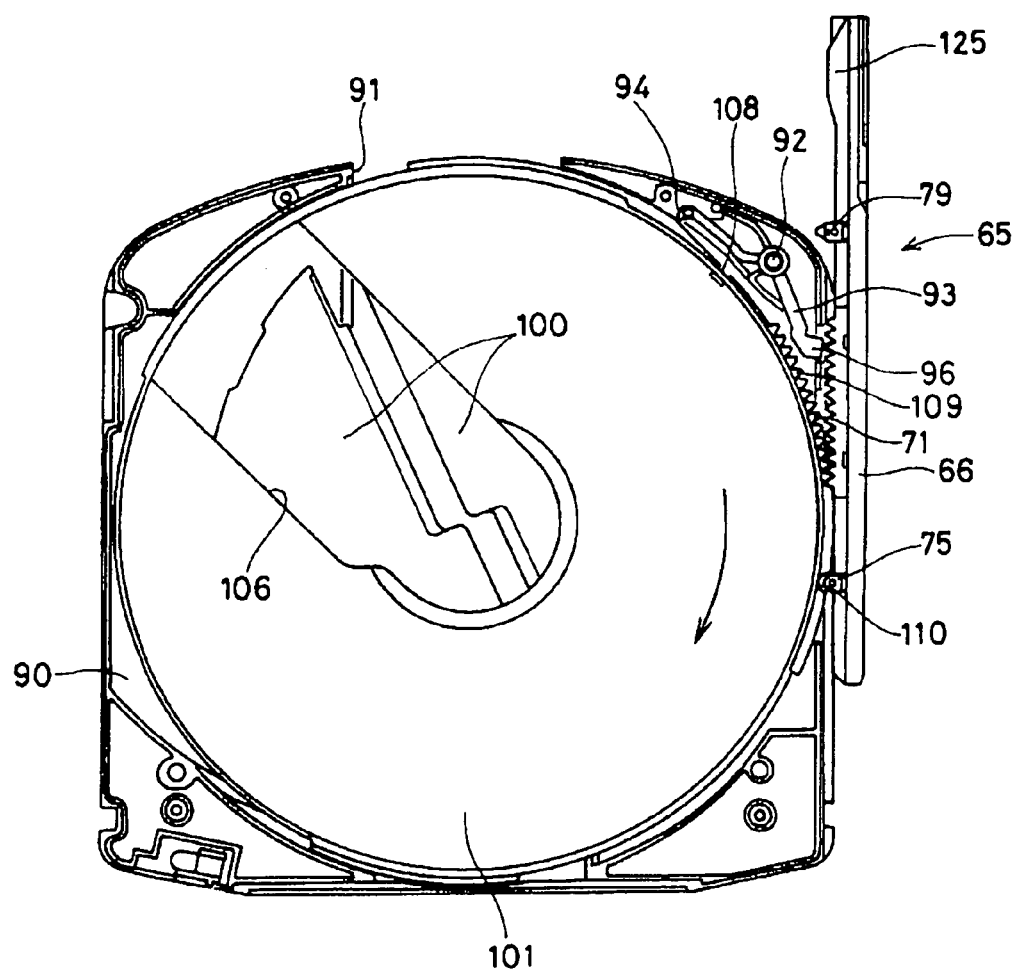
FIG. 29 is another plan view showing the release operation of the shutter.
Figure 30:
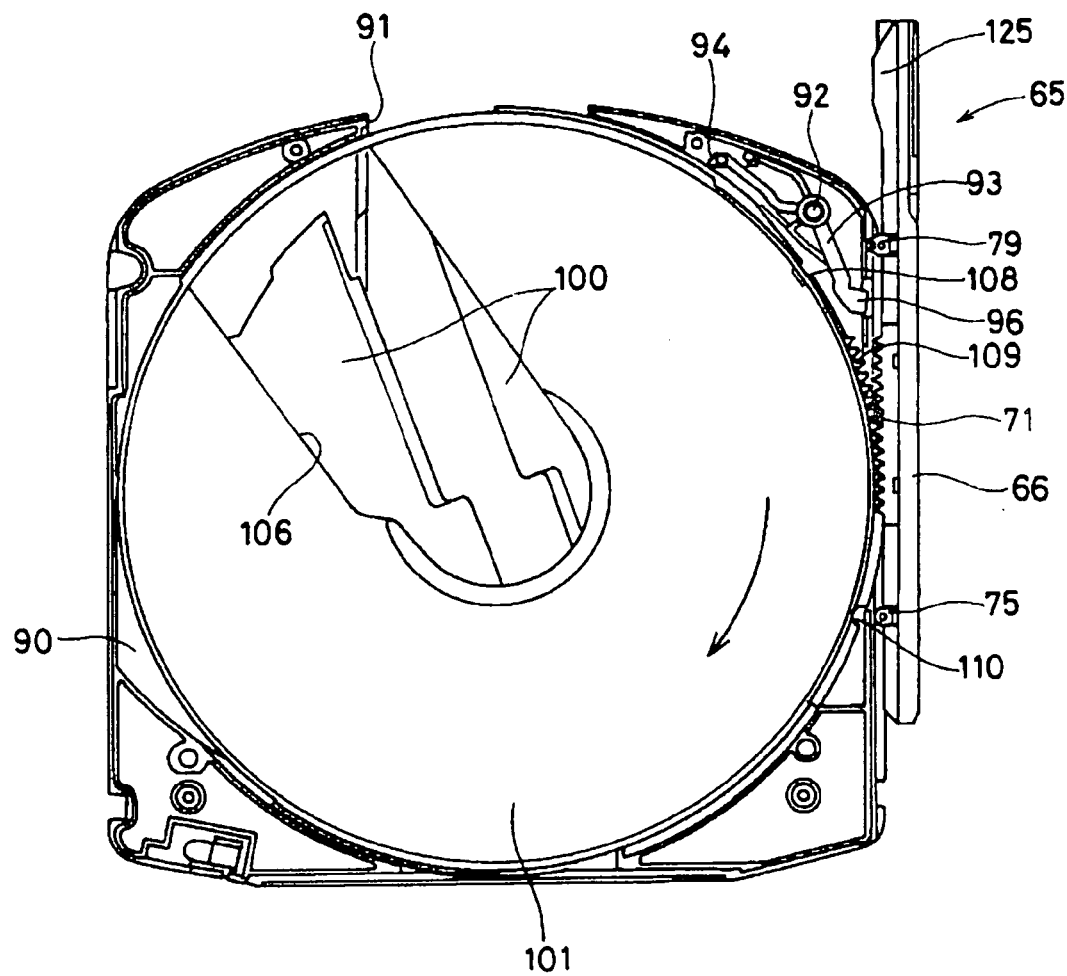
FIG. 30 is a further plan view showing the release operation of the shutter.
Figure 31:
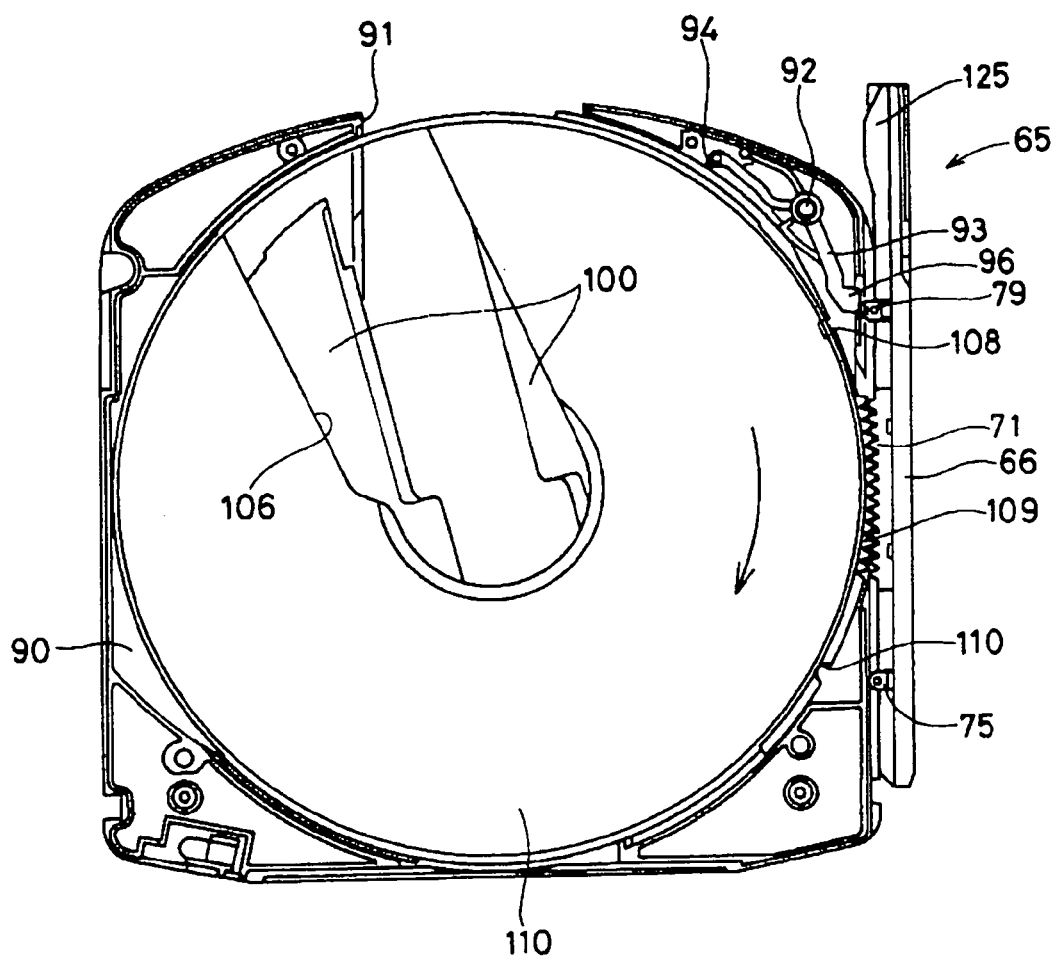
FIG. 31 is a still further plan view showing the release operation of the shutter.

As shown in FIG. 29, the phase shift rectifying member 75 is engaged with the engaging recess 110 while the inner shell 101 is being swung within a relatively small angle. However, when the rack 71 of the opening and closing base 66 engages with the segment gear 109 of the inner shell 101 as shown in FIG. 30, the phase shift rectifying member 75 leaves the engaging recess 110 of the inner shell 101. Consequently, after that, by the movement of the opening and closing base 66, the rack 71 swings the inner shell 101 in the same direction while being engaged with the segment gear 109. Thereby, the shutter plate 100 gradually widens the opening 106 of the inner shell 101 (see FIG. 31).

Figure 32:
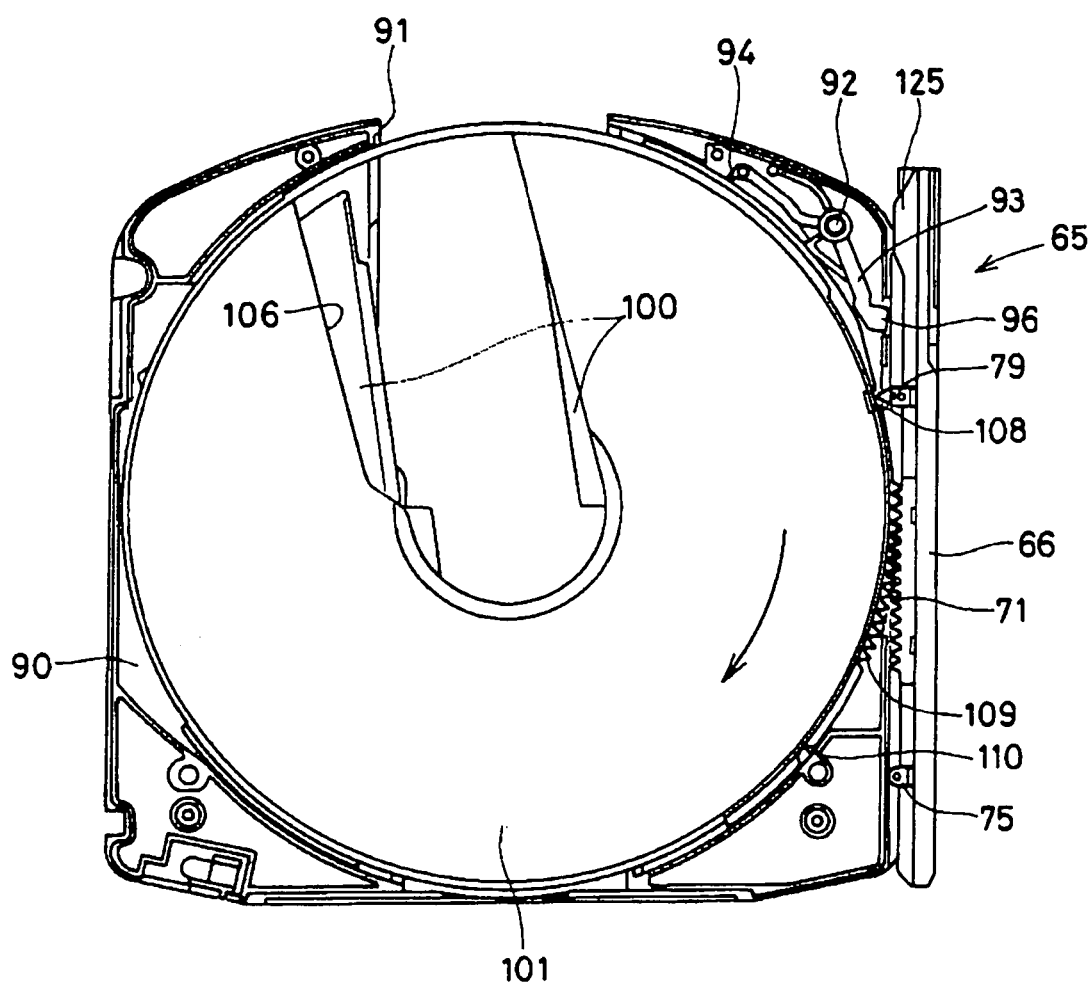
FIG. 32 is a still further plan view showing the release operation of the shutter.
Figure 33:
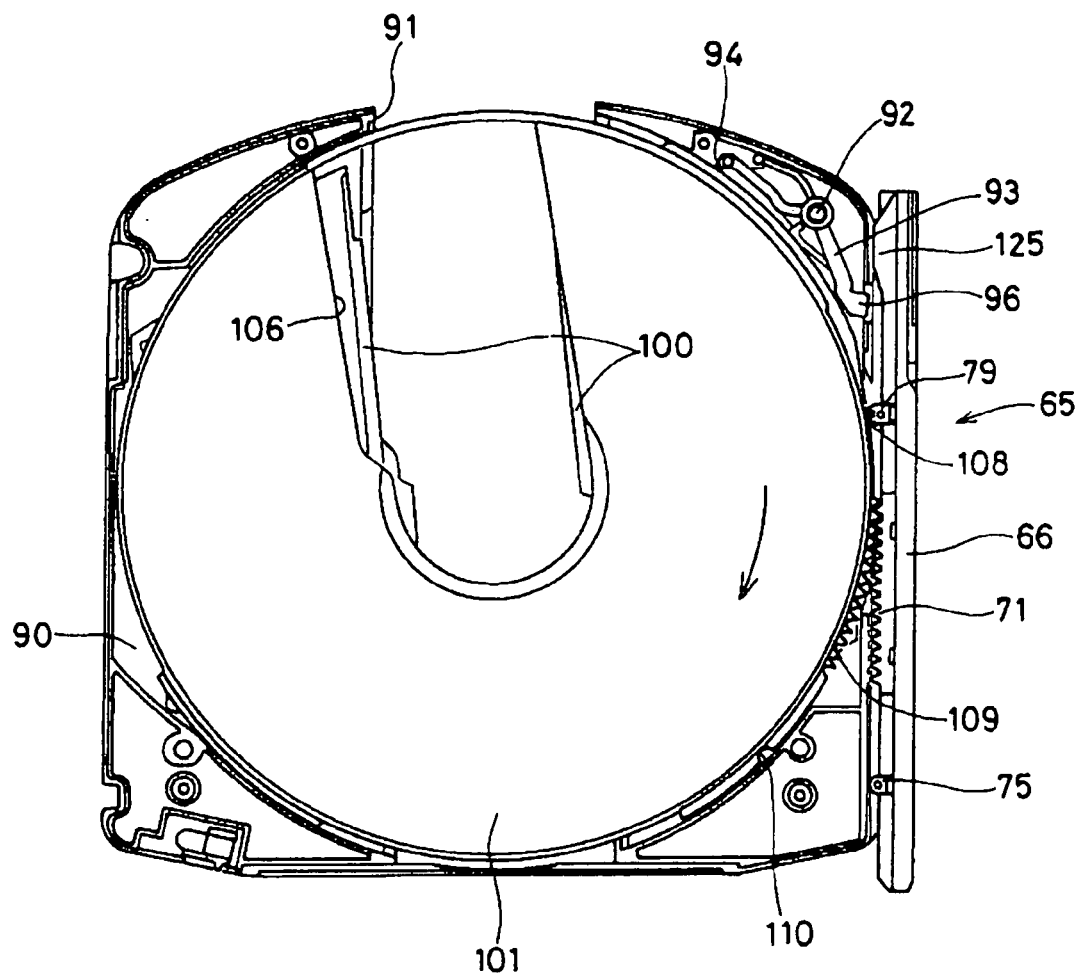
FIG. 33 is a still further plan view showing the release operation of the shutter.
Figure 34:
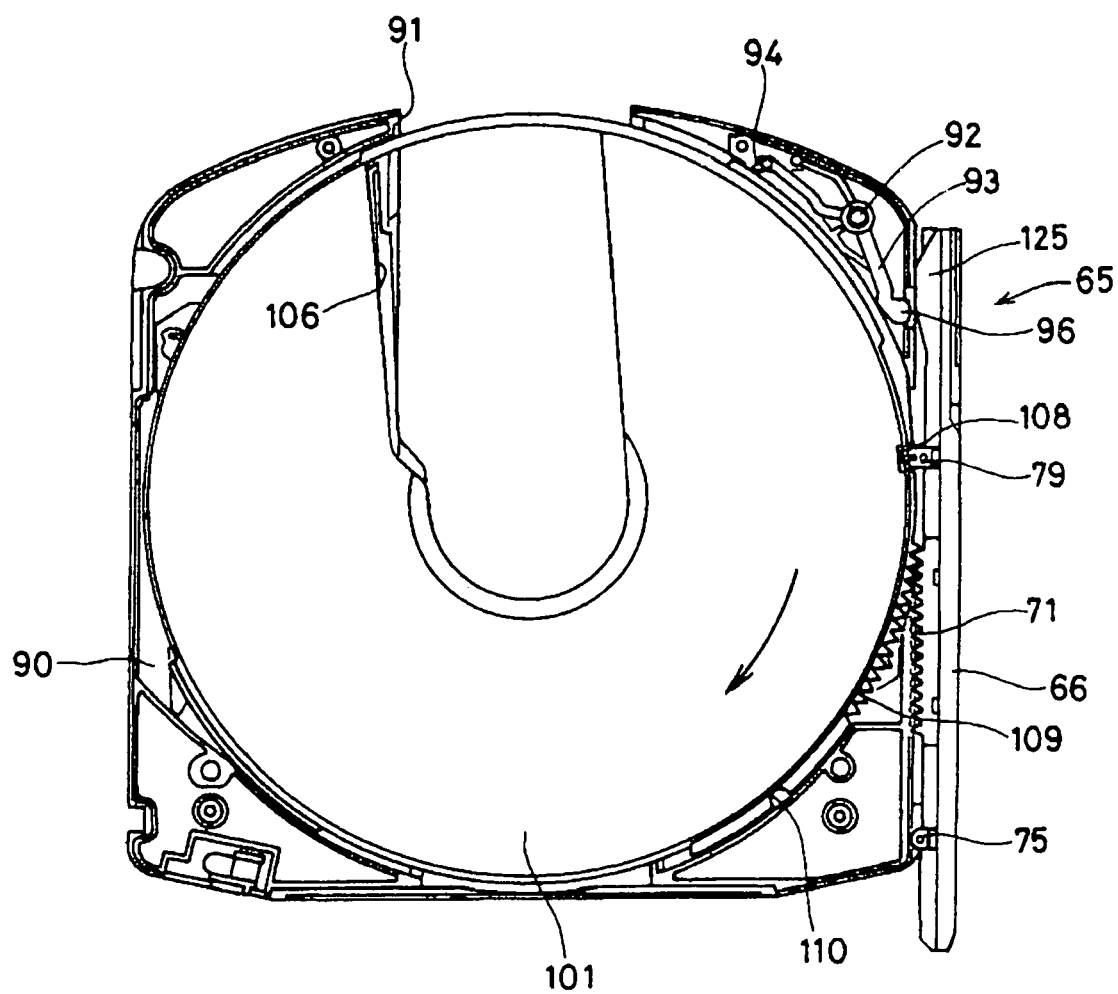
FIG. 34 is a still further plan view showing the release operation of the shutter.

As shown in FIG. 32, when the inner shell 101 has been opened about 40 degrees from the position shown in FIG. 27, the phase shift rectifying member 79 on the rear side of the opening and closing base 66 is engaged with the portion to be locked 108 of the inner shell 101. Consequently, after that, the phase shift rectifying member 79 on the rear side chiefly rotates the inner shell 101 in a clockwise direction. Then, when the inner shell 101 is rotated by about 50 degrees as shown in FIG. 34 after passing a state shown in FIG. 33, the shutter plates 100 completely release the opening 106.

Figure 35:
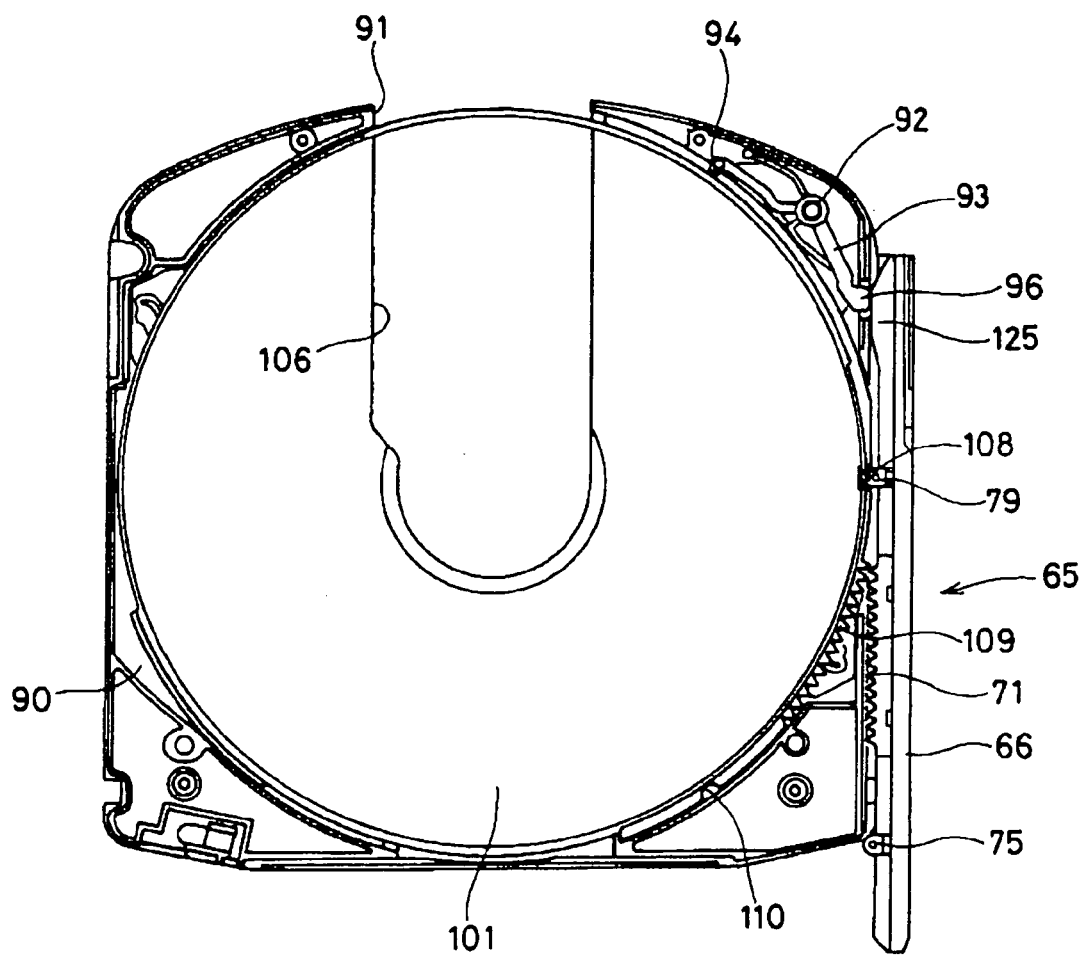
FIG. 35 is a still further plan view showing the release operation of the shutter.
Figure 36:
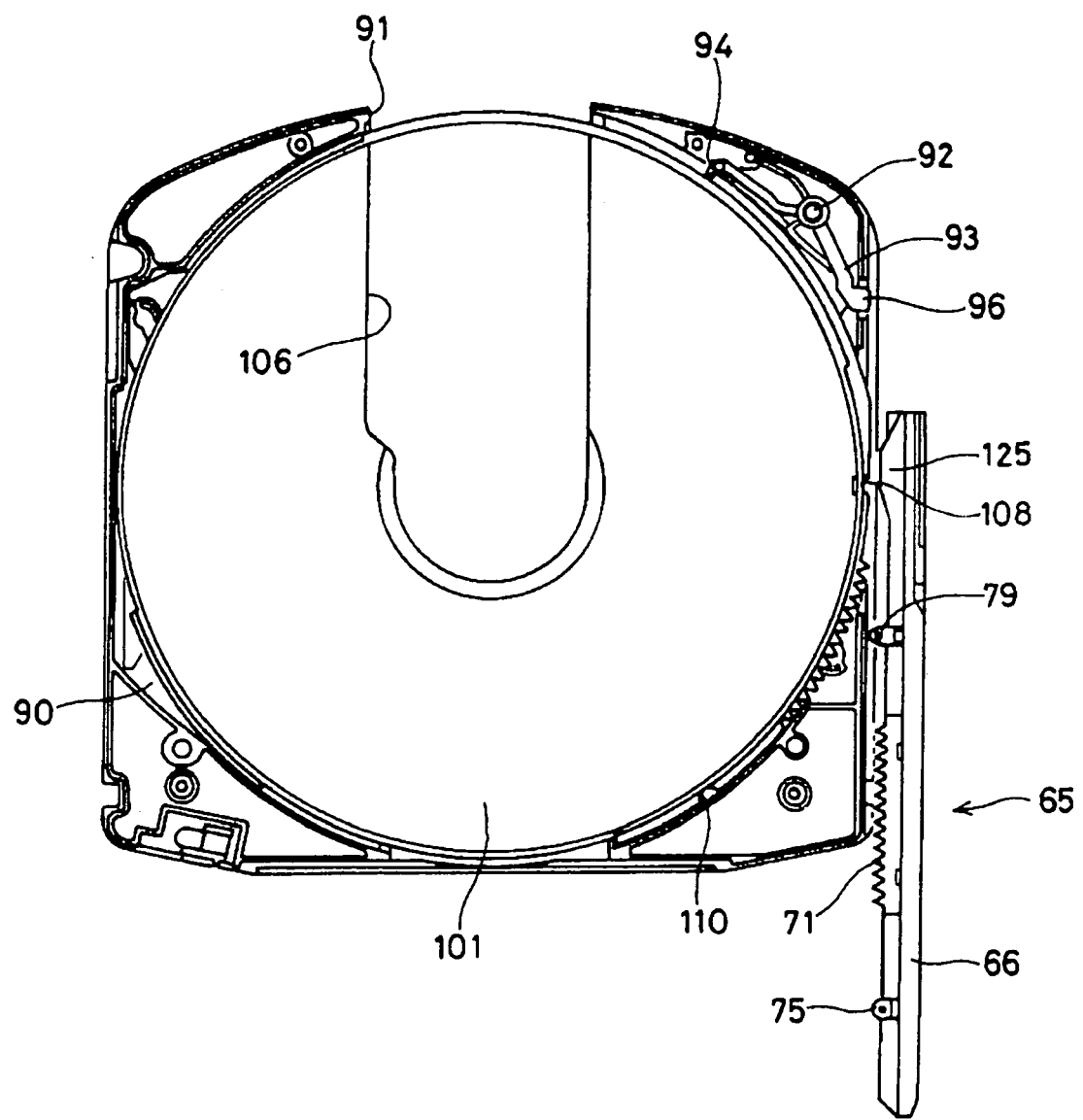
FIG. 36 is a plan view showing a state in which the shutter is completely released.

Then, when the inner shell 101 is furthermore rotated in the clockwise direction by the phase shift rectifying member 79 on the rear side of the opening and closing base 66, as shown in FIG. 35, the released opening 106 of the inner shell 101 and the opening 91 of the lower shell 90 are almost completely matched. Incidentally, at this time, the portion to be locked 108 of the inner shell 101 is at right most position in the figure. Then, in this state, the locking portion 94 of the lock lever 93 engages with the end of a projection 111 of the inner shell 101, and the inner shell 101 is locked in the released state.

Figure 23:
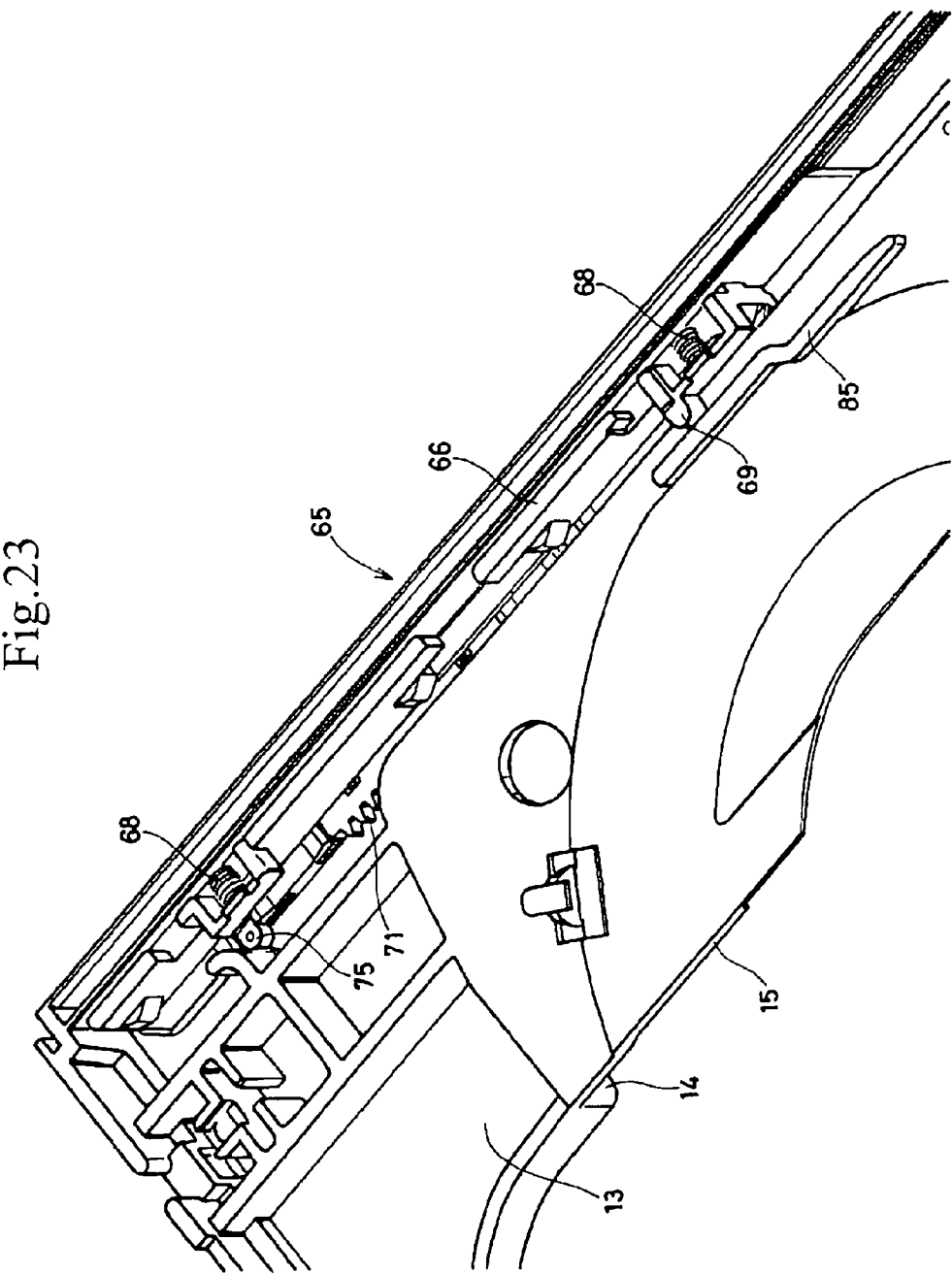
FIG. 23 is a perspective view of the back side of the tray in the state in which the shutter opening and closing mechanism has been retreated.

Then, after that, as shown in FIG. 23 and FIG. 25, the cam 85 on the back side of the tray 13 presses back the projection 69 of the opening and closing base 66. Thereby, the shutter opening and closing mechanism 65 is retracted. Consequently, as shown in FIG. 36, the shutter plates 100 are completely released, and the shutter opening and closing mechanism 65 is separated from the cartridge 51 in a state in which the opening 106 of the inner shell 101 and the opening 91 of the lower shell 90 are matched.

Incidentally, the operation of closing the shutter plates 100 is performed as one converse to the operation described above. That is, the shutter plates 100 of the DVR cartridge 51 mounted on the tray 13 is closed in conjunction with the pulling out of the tray 13 moved to the recording and reproducing position as shown in FIG. 18 to move the tray 13 to the pulled-out position as shown in FIG. 16.

The operation is conversely performed in a sequence shown in FIG. 36 to FIG. 27. That is, the portion to be pressed 96 of the lock lever 93 of the cartridge 51 is first pressed by a projection 125 at a rear end of the opening and closing base 66 to release the lock of the projection 111 of the inside shell 101 by the lock lever 93. Then, after that, phase shift rectifying member 79 on the rear side of the opening and closing base 66 first engages with the portion to be locked 108 of the inner shell 101 to rotate the inner shell 101 in a counterclockwise direction. Then, before the phase shift rectifying member 79 is separated from the portion to be locked 108, the segment gear 109 is pressed by the rack 71 to rotate the same direction. Then, at last, the phase shift rectifying member 75 on the front side returns the inner shell 101 to the initial rotation position while engaging with the engaging recess 110 of the inner shell 101. Consequently, the opening 106 of the inner shell 101 and the opening 91 of the lower shell 90 are shifted from each other. It follows then that the pair of the shutter plates 100 completely closes the opening 106 of the inner shell 101.

Now, a description will be given to the release operation of the shutter plates 100 of the cartridge 51 in a case where the shutter plates 100 loaded not in the state in which the opening 106 of the inner shell 101 is completely closed as shown in FIG. 27 and FIG. 28, but in the state in which the opening 106 is half opened as shown in FIG. 29 or FIG. 30.

In this case, the release operation is performed in the state in which the phase shift rectifying member 75 on the front side of the shutter opening and closing mechanism 65 does not fully function. That is, the phase shift rectifying member 75 does not exactly engage with the engaging recess 110 of the inner shell 101. The phase shift rectifying member 75 is rather engages with the segment gear 109, or the phase shift rectifying member 75 does not perform any release operation. Then, the rack 71 of the shutter opening and closing mechanism 65 directly engages with the segment gear 109 of the inner shell 101 to rotate the inner shell 101 in a clockwise direction. Consequently, in this case, the release operation of the shutters 100 is performed faster than that in a case of the loading operation in the state in which the shutters 100 are completely closed.

Then, after that, the opening and closing base 66 of the shutter opening and closing mechanism 65 further slides on the side face of the cartridge 51 relatively. And the phase shift rectifying member 79 of the shutter opening and closing mechanism 65 slides on the top surface of the projection between the segment gear 109 and the portion to be locked 108 on the outer periphery portion of the inner shell 101 in the state in which the rack 71 is separated from the segment gear 109. As described above, the phase shift rectifying member 79 is pressed by the spring 82 and is provided with a limiter function. Consequently, the phase shift rectifying member 79 slips on the outer periphery surface of the inner shell 101 by the limiter function to engage with the portion to be locked 108 of the inner shell 101 finally as shown in FIG. 33.

That is, the relative slip of the phase shift rectifying member 79 on the outer periphery surface of the inner shell 101 absorbs errors of the opening and closing strokes of the shutter plates 100 in the state of being half opened. Consequently, as shown in FIG. 35 and FIG. 36, the shutter plates 100 are compulsively made to be opened completely finally by the phase shift rectifying member 79. That is, even if the shutter plates 100 are placed on the tray 13 to be loaded in the state of being half opened, the shutter plates 100 of the cartridge 51 are always moved to the recording and reproducing position in the state of being fully opened as shown in FIG. 36, and smooth recording and reproducing operations can be performed.

Next, an examination will be given to a case where the shutter plates 100 are moved from the recording and reproducing position to the pulled-out position by the tray 13 not in the state of being fully opened as shown in FIG. 36, but in the state of being partially closed as shown in, for example, FIG. 33 or FIG. 34. In this case, the operation of the phase shift rectifying member 79 to engage with the portion to be locked 108 of the inner shell 101 for swinging the inner shell 101 is imperfect, or the operation is not performed, but the rack 71 on the opening and closing base 66 swings the segment gear 109 of the inner shell 101 in a counterclockwise direction.

Then, after that, the phase shift rectifying member 75 on the front side slides on the outer periphery surface between the segment gear 109 and the engaging recess 110 of the inner shell 101. The sliding operation of the phase shift rectifying member 75 on the rear side on the outer periphery surface of the inner shell 101 absorbs unsettled strokes in the half-opened states of the shutter plates 100. Then, as shown in FIG. 28, the opening 106 of the inner shell 101 is finally closed completely by the shutter plates 100 in the state in which the phase shift rectifying member 75 on the front side of the opening and closing base 66 is correctly engaged with the engaging recess 110 of the inner shell 101. Consequently, even if the DVR cartridge 51 is ejected in the half-opened state, the cartridge 51 is ejected in the state of being completely closed with the shutter plates 100.

As described above, the shutter opening and closing mechanism 65 in the disc type recording and reproducing apparatus of the present embodiment is composed of the opening and closing base 66, the phase shift rectifying member 75 on the front side for opening the shutter completely at the time of ejection, the phase shift rectifying member 79 on the rear side for opening the shutter completely at the time of loading, and the rack 71 for swinging the inner shell 101 by engaging with the segment gear 109 of the inner shell 101 of the cartridge 51.

Hereupon, the shutter opening and closing mechanism 65 relatively slides on a side face of the cartridge 51 on the tray 13 by a pulling-in operation of the tray 13 to the recording and reproducing position. Thereby, the shutter opening and closing mechanism 65 catches the segment gear 109 and the engaging recess 110 of the inner shell 101, both exposed on the side face of the cartridge 51, to swing the inner shell 101. Then, the shutter opening and closing mechanism 65 releases the pair of shutter plates supported by the inner shell 101 in the state of swinging freely.

Then, after the shutter plates 100 have been fully opened, the shutter opening and closing mechanism 65 is made away from the side face of the cartridge 51 by means of the cam 85 formed on the back face of the tray 13. Thereby, backlash gathering to the cartridge 51 is released. Consequently, there is no such a case that the positioning of the case of the cartridge 51 is disturbed at the time of the chucking of a disc in the case.

Moreover, after the chucking of the disc in the case has been released in the process of moving the tray 13 from the recording and reproducing position to the pulled-out position, the shutter opening and closing mechanism 65 is again pressed to the side face of the cartridge 51 by the force of the compressed coil springs 68 provided in the opening and closing base 66. Thereby, the backlash gathering to the cartridge 51 is performed. Then, when the ejection of the tray 13 begins, the pair of shutter plates 100 is closed as described above in the process reverse to that of the drawing-in operation in the tray 13. Then, after both of the opening 106 of the inner shell 101 and the opening 91 of the lower shell 90 have fully been opened by the shutter plates 100, the ejection of the tray 13 is performed. Thereby, stains of the optical disc in the case can be prevented.

Moreover, the disc type recording and reproducing apparatus highly precisely supports the cartridge 51 drawn into the recording and reproducing position by the tray 13 by means of the pair of support rods 45 and the pair of support arms 46 on the base unit 25 as shown in FIG. 7 to FIG. 9. At this time, the lower shell 90 of the cartridge 51 is in the state in which the lower shell 90 floats up from the surface of the recess 14 of the tray 13 by about 1 mm. Then, in the state like this, as shown in FIG. 37 to FIG. 39B, the cartridge 51 is separated to be elastically pressed from the upper side by the pressing mechanisms.

The pressing mechanisms are severally composed of the pressing roller 119, the coil spring 120 and the pin 117 as shown in FIG. 38. The pressing mechanisms are severally fitted to the parts of the four openings 116 of the holder plate 115. Then, the cartridge 51 raised by the base unit 25 is pressed from the top surface thereof by the pressing mechanisms with a high degree of accuracy. Thereby, the pressing mechanisms severally have the function of stabling the base unit 25.

At the time of opening and closing the tray 13, the above-mentioned pressing roller 119 slides on the top surfaces of the cartridge 51 and the tray 13 slightly. Accordingly, a slight pressing force is applied through the pressing roller 119 so as not to scratch the top surface of the cartridge 51 and the top surface of the tray 13. Moreover, for lessening the dispersion of the pressing force owing to the variation in dimensions, the spring constants of the coil springs 120 are set to be as small as possible by increasing the numbers of turnings of the coil springs 120. Consequently, it becomes possible to position the DVR cartridge 51 drawn into the recording and reproducing position with a high degree of accuracy by means of the pressing mechanism like this.

Moreover, the embodiment described above pertains to the apparatus configured to move the cartridge from the pulled-out position to the recording and reproducing position by means of the tray. However, the present invention is remarkably characterized by retracting the shutter opening and closing mechanism after the shutter has been opened to release a load imposed on the cartridge. Such a characteristic can effectively be used for a recording and reproducing apparatus adopting a loading mechanism such as a hop-up mechanism or a slot-in mechanism other than the method using the tray for loading the cartridge in the embodiment described above.

The present invention is a disc type recording and/or reproducing apparatus moving a cartridge housing a disc-like recording medium in its case to a recording and reproducing position by means of a tray to perform recording and/or reproducing by means of a head, the apparatus characterized by including: a shutter for opening and closing an opening formed in the case of the cartridge for allowing the head to access to the disc-like recording medium; and a shutter opening and closing mechanism provided on a side of the apparatus in order to open and close the shutter, wherein the shutter is opened by a relative motion of the shutter opening and closing mechanism to the cartridge when the cartridge is moved to the recording and reproducing position by the tray, and the shutter is closed by a relative motion of the shutter opening and closing mechanism to the cartridge when the cartridge is moved to a pulled-out position by the tray.

Consequently, according to such a configuration, when the tray mounting the cartridge is moved to the recording and reproducing position side, the shutter of the cartridge is automatically released. Moreover, when the tray mounting the cartridge is moved from the recording and reproducing position to the pulled-out position side, the shutter of the cartridge is automatically closed. That is, the opening and closing of the shutter of the cartridge are automatically performed making use of the moving operations of the tray.

Moreover, the present invention is a disc type recording and/or reproducing apparatus moving a cartridge housing a disc-like recording medium in its case from a first position at which the cartridge is mounted or demounted to a second position at which recording and/or reproducing is performed by means of a head, the apparatus characterized by including: a shutter for opening and closing an opening of the case of the cartridge for access of the head to the disc-like recording medium in the case; and a shutter opening and closing mechanism provided on a side of the apparatus in order to open and close the shutter, in which the shutter is released by a relative motion of the shutter opening and closing mechanism to the cartridge when the cartridge is moved to the first position to the second position, and the shutter opening and closing mechanism releases a pressing force applied to the cartridge by the mechanism when a release of the shutter is completed. Consequently, according to such a configuration, the release of the shutter is performed making use of the relative motion of the shutter opening and closing mechanism to the cartridge when the cartridge moves from the first position to the second position. Moreover, when the release of the shutter is completed, the pressing force applied to the cartridge by the shutter opening and closing mechanism is released. Consequently, the cartridge does not receive any side pressure from the shutter opening and closing mechanism in the state in which the shutter has been released. Thereby, bad influences of the shutter opening and closing mechanism at the time of recording and reproducing operations can be removed.

Furthermore, the present invention is a disc type recording and/or reproducing apparatus moving a cartridge housing a disc-like recording medium in its case to a recording and reproducing position by means of a tray to perform recording and/or reproducing by means of a head, the apparatus characterized by including: a rotary drive section for driving the disc-like recording medium; a base unit including a head for accessing the disc-like recording medium to perform the recording and/or reproducing; supporting means for supporting the cartridge in a state of floating up from the tray in accordance with a rising operation of the base unit, the supporting means is provided on the base unit; and a holder plate provided with pressing means for pressing a plurality of portions of a top surface of the cartridge elastically, the holder plate arranged above the tray drawn-into the recording and reproducing position.

Consequently, according to such a disc type recording and/or reproducing apparatus, the plurality of portions of the top surface of the cartridge drawn into the recording and reproducing position is elastically pressed by the pressing means. Thereby, it becomes possible to position the cartridge correctly.

What is claimed is:

1. A disc type recording and/or reproducing apparatus which moves a cartridge housing a disc-like recording medium in a case thereof to a recording and reproducing position by means of a tray to perform recording and/or reproducing by means of a head, said apparatus characterized as comprising:

a shutter for opening and closing an opening formed in said case of said cartridge for allowing said head to access to said disc-like recording medium; and a shutter opening and closing mechanism provided on a side of said apparatus in order to open and close said shutter, and characterized in that:

said shutter is opened by a relative motion of said shutter opening and closing mechanism to said cartridge when said cartridge is moved to said recording and reproducing position by means of said tray, said shutter is closed by a relative motion of said shutter opening and closing mechanism to said cartridge when said cartridge is moved to a pulled-out position by means of said tray; and characterized in that said tray is provided with a stopper for pressing said shutter opening and closing mechanism to a portion to be operated of said cartridge in order that said shutter opening and closing mechanism relatively slides on said stopper when said shutter is opened or said shutter is closed.

2. The disc type recording and/or reproducing apparatus according to claim 1, characterized in that said tray includes means for separating said shutter opening and closing mechanism from a portion to be operated of said cartridge in order that said shutter opening and closing mechanism releases a pressing force applied to said cartridge by said mechanism when a release of said shutter is completed or a close of said shutter is completed.

3. The disc type recording and/or reproducing apparatus according to claim 1, characterized in that said shutter opening and closing mechanism is provided with a phase shift rectifying member for a release operation, and a limiter function is given to said phase shift rectifying member by a compression coil spring to make a shutter be in a fully opened state by engaging with a releasing recess on a side of said cartridge even if said cartridge whose shutter opening is unsettled in mounted.

4. The disc type recording and/or reproducing apparatus according to claim 1, characterized in that said shutter opening and closing mechanism is provided with a phase shift rectifying member for a close operation, and a limiter function is given to said phase shift rectifying member by a compression coil spring to make a shutter be in a fully closed state by engaging with a closing recess on a side of said cartridge even if said cartridge whose shutter opening is unsettled is ejected.

5. A disc type recording and/or reproducing apparatus which moves a cartridge housing a disc-like recording medium in a case thereof, by means of a tray, from a first position at which said cartridge is mounted or demounted to a second position at which recording and/or reproducing is performed by means of a head, said apparatus characterized as comprising:

a shutter for opening and closing an opening of said case of said cartridge for allowing said head to access to said disc-like recording medium in said case; and a shutter opening and closing mechanism provided on a side of said apparatus in order to open and close said shutter, and characterized in that:

said shutter is released by a relative motion of said shutter opening and closing mechanism to said cartridge when said cartridge is moved from said first position to said second position, and, further, said shutter opening and closing mechanism releases a pressing force applied to said cartridge by said mechanism when a release of said shutter is completed, characterized in that said tray is provided with a stopper for pressing said shutter opening and closing mechanism to a portion to be operated of said cartridge in order that said shutter opening and closing mechanism relatively slides on said stopper when said shutter is opened or said shutter is closed.

* * * * *